United States Patent
Budovski et al.

(10) Patent No.: US 11,709,824 B2
(45) Date of Patent: Jul. 25, 2023

(54) CONSOLIDATING TRANSACTION LOG REQUESTS AND TRANSACTION LOGS IN A DATABASE TRANSACTION LOG SERVICE

(71) Applicant: Microsoft Technology Licensing, LLC, Redmond, WA (US)

(72) Inventors: Alexander Budovski, Boonville, MO (US); Eric Dean Lee, Andover, MA (US); Ashmita Raju, Bangalore (IN); Srikanth Sampath, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/481,766

(22) Filed: Sep. 22, 2021

(65) Prior Publication Data

US 2022/0382743 A1    Dec. 1, 2022

(30) Foreign Application Priority Data

May 28, 2021   (IN) .............................. 202141023936

(51) Int. Cl.
*G06F 16/21* (2019.01)
*G06F 16/23* (2019.01)
(Continued)

(52) U.S. Cl.
CPC ........ *G06F 16/2379* (2019.01); *G06F 16/172* (2019.01); *G06F 16/215* (2019.01)

(58) Field of Classification Search
CPC ........... G06F 16/23; G06F 16/17; G06F 16/21
See application file for complete search history.

(56) References Cited

U.S. PATENT DOCUMENTS 6,185,615 B1    2/2001  Labiaga et al.
7,051,330 B1 *  5/2006  Kaler ................... G06F 9/4843
                                                       718/103

(Continued)

FOREIGN PATENT DOCUMENTS

EP          0839352 A1     5/1998

OTHER PUBLICATIONS

"Manage high availability and disaster recovery", Retrieved from: https://web.archive.org/web/20210227004647/https://www.microsoftpressstore.com/articles/article.aspxp=2832586&seqNum=4, Jul. 11, 2017, 38 Pages.

(Continued)

*Primary Examiner* — Tyler J Torgrimson
*Assistant Examiner* — Maher N Algibhah
(74) *Attorney, Agent, or Firm* — Weaver IP L.L.C.

(57) ABSTRACT

Methods, systems, and computer program products are provided for consolidating transaction log requests and transaction logs in a database transaction log service. A scalable log service may manage log requests and logs to reduce resource consumption, such as memory and I/O. Log requests may be managed by consolidating (e.g., organizing, merging and/or de-duplicating) the log requests. Transaction log requests may be mapped to read requests for transaction log storage devices in less than a one-to-one ratio. Transaction logs may be managed by using the consolidated log requests to consolidate (e.g., and prefetch) transaction logs from multiple cache and/or storage tiers to a log pool cache. Log requests may be served from the log pool cache.

20 Claims, 7 Drawing Sheets

(51) Int. Cl.
*G06F 16/17* (2019.01)
*G06F 16/215* (2019.01)
*G06F 16/172* (2019.01)

(56) References Cited

U.S. PATENT DOCUMENTS

| | | | | |
|---|---|---|---|---|
| 10,885,023 | B1* | 1/2021 | Gupta | G06F 3/0613 |
| 11,294,931 | B1* | 4/2022 | Ren | G06F 16/27 |
| 2005/0071251 | A1* | 3/2005 | Linden | G06Q 30/0256 |
| | | | | 705/26.7 |
| 2013/0132433 | A1* | 5/2013 | Ozertem | G06F 16/951 |
| | | | | 707/E17.014 |
| 2016/0085772 | A1* | 3/2016 | Vermeulen | G06F 16/21 |
| | | | | 707/615 |
| 2020/0192903 | A1* | 6/2020 | Bansal | G06F 16/2237 |
| 2020/0233857 | A1* | 7/2020 | Fehling | G06Q 10/10 |
| 2021/0397623 | A1* | 12/2021 | Tsubouchi | G06F 16/24575 |
| 2022/0121628 | A1* | 4/2022 | Devaraj | G06F 16/1824 |

OTHER PUBLICATIONS

Gupta, Rajendra, "Data synchronization in SQL Server Always On Availability Groups", Retrieved from: https://web.archive.org/web/20200512162151/https://www.sqlshack.com/data-synchronization-in-sql-server-always-on-availability-groups/, May 3, 2019, 6 Pages.
"International Search Report and Written Opinion Issued in PCT Application No. PCT/US22/027538", dated Aug. 19, 2022, 12 Pages.

* cited by examiner

CONSOLIDATING TRANSACTION LOG REQUESTS AND TRANSACTION LOGS IN A DATABASE TRANSACTION LOG SERVICE

CROSS-REFERENCE TO RELATED APPLICATIONS

This application claims priority to Indian Patent Application No. 202141023936, filed on May 28, 2021, and entitled "CONSOLIDATING TRANSACTION LOG REQUESTS AND TRANSACTION LOGS IN A DATABASE TRANSACTION LOG SERVICE," the entirety of which is incorporated by reference herein.

This application is related to the following patent applications, filed contemporaneously herewith, the contents of each of which are incorporated by reference in their entireties as if fully set forth herein:

U.S. patent application Ser. No. 17/481,764, entitled "ASYNCHRONOUS PROCESSING OF TRANSACTION LOG REQUESTS IN A DATABASE TRANSACTION LOG SERVICE"; and U.S. patent application Ser. No. 17/481,775, entitled, "TRANSACTION LOG VALIDATION IN A DATABASE TRANSACTION LOG SERVICE."

BACKGROUND

A database is an organized collection of data, generally stored and accessed electronically from a computer system. Users at computing devices may read data from a database, as well as write data to the database and modify data in the database through the use of queries. Queries are formal statements of information needs, such as a search string applied to a table in a database. A database management system (DBMS) includes program code that interacts with end users, applications, and the database itself to capture and analyze the data. The DBMS additionally encompasses the core facilities provided to administer the database. The sum total of the database, the DBMS and the associated applications may be referred to as a "database system". The term "database" is also often used to loosely refer to any of the DBMS, the database system or an application associated with the database.

SQL (structured query language) is a domain-specific language used in programming and designed for managing data held in a relational database management system (RDBMS), or for stream processing in a relational data stream management system (RDSMS). SQL is particularly useful in handling structured data, which is data incorporating relations among entities and variables. A query plan (or query execution plan) is a sequence of steps used to access data in a SQL RDBMS according to a query.

A database, such as an SQL database, may need to be scaled as the number of clients, number of read and/or write queries, amount of data, number of query servers, and/or number of storage devices increases. Such scaling increases costs and may not ultimately be able to support demands on the database adequately. Large numbers of transactions to serve, and the maintenance of all copies of data in the database on many devices, may exhaust the memory, processing threads, and/or input/output (I/O) capabilities of database system devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for consolidating transaction log requests and transaction logs in a database transaction log service. A scalable log service manages log requests and logs to reduce resource consumption, such as memory and I/O. Log requests are managed by consolidating (e.g., organizing, merging and/or de-duplicating) the log requests. Transaction log requests are mapped to read requests for transaction log storage devices in less than a one-to-one ratio. Transaction logs are managed by using the consolidated log requests to consolidate (e.g., and prefetch) transaction logs from multiple cache and/or storage tiers to a log pool cache. Log requests may be served from the log pool cache.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
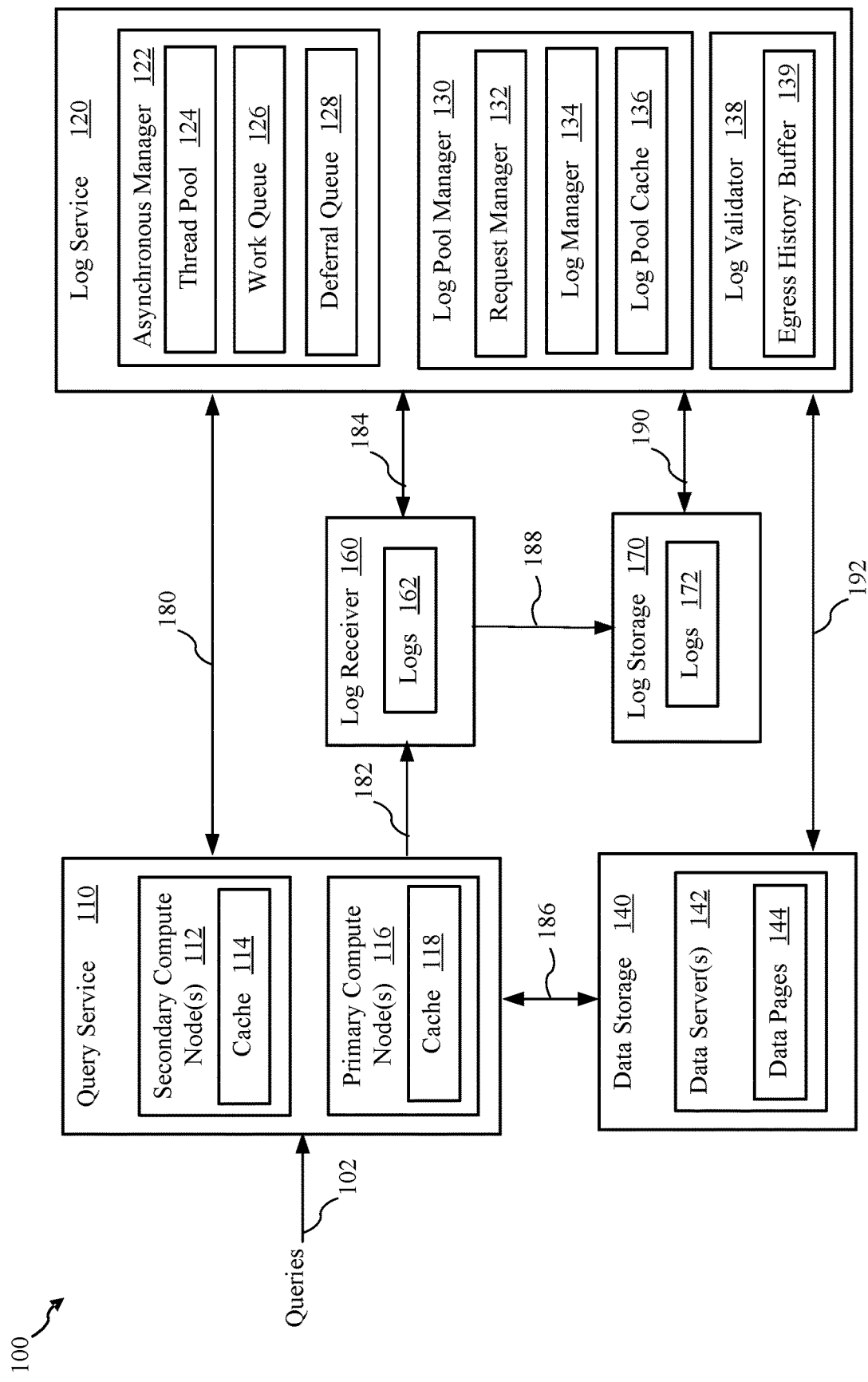
FIG. 1 shows a block diagram of a system for a database transaction log service, according to an example embodiment.

The features and advantages of the present invention will become more apparent from the detailed description set forth below when taken in conjunction with the drawings, in

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Further detail on embodiments is provided in this section. Example database system environments in which embodiments may be implemented are described as follows, followed by further description of more specific embodiments.

A. Example Database System Embodiments

A database (e.g., an SQL database, such as Microsoft® Azure® SQL Database) may be used in a variety of computing environments, such as a cloud environment. A database may be implemented with a database engine. A database engine may have one or more engine components, such as a query engine and a storage engine. A database engine and/or components therein (e.g., query and/or storage engines) may have front-end (FE) and back-end (BE) components. Customer/Client users and/or applications may interact with one or more FE components (e.g., a query engine), but may be unaware of one or more BE components (e.g., a storage engine). A query engine (e.g., an SQL engine in an SQL server) may be a portion of a database engine that executes query logic. A query engine may process queries and determine behaviors. Queries may read data and/or write data (e.g., add, change, delete data). A query engine may evaluate a query, for example, to determine query compatibility with other SQL implementations and/or behaviors.

There may be multiple copies/replicas of data. For example, there may be multiple people using different devices to review and/or edit the same data or the same files. Transaction logs may be generated and used to maintain records of changes to data in various data replicas. Clients (e.g., query servers and data servers) may request and/or receive (e.g., be served with) transaction logs to maintain their respective copies of data. An SQL database may serve clients with transaction logs (e.g., in response to a configuration or a request to provide logs). Serving logs may be constrained by available resources (e.g., a resource constrained service).

A database engine (e.g., an SQL database engine) may be implemented as multiple services (e.g., microservices). The multiple services may include, for example, a compute service, a log service, and a storage service.

A compute service may be an FE that a customer may see and interact with. A compute service may be implemented as one or more compute nodes in a query engine. Compute nodes may be implemented as servers (e.g., SQL servers), for example, with or without local data files or log files. Customer/client computing applications and users may interact with compute nodes as a query server. Compute nodes may provide query execution logic. Compute nodes may include primary and secondary compute nodes. Queries may change (e.g., update) data (e.g., via a primary compute node) or may perform read-only transactions (e.g., via a secondary compute node). Changes to data may be logged and promulgated (e.g., by a log service).

A storage service in a storage engine may be implemented with data servers. Data servers that manage "pages" of data may be referred to as page servers. Page servers may be implemented as a scalable service, e.g., more page servers for a large amount of data and fewer page servers for less data. Each of multiple page servers in a storage engine may manage one or more data pages (e.g., a configured or defined set of data pages). For example, a page server may manage 128 GB, 256 GB, 512 GB or 1 TB of data pages.

A log service may serve clients (e.g., query servers and data servers) with transaction logs (e.g., in response to a configuration or a request from transaction log clients such as replica compute nodes and data servers to provide logs). Log service may serve logs in the form of log blocks. A log block may be a unit of memory suitable for transferring over a network (e.g., 60 kilobytes). A (e.g., each) log block may have an identity. An identity of a log block may be its position in a logical stream of log blocks. A log service may manage the flow of transaction log data. A log service may support propagation of logged updates to data to the cached and stored replicas of each changed page. A log service may support persistent storage of logged updates, e.g., for future reference or use. A log service may be internal or external to a database.

Database services (e.g., n service external to a database such as an external log service) may interact to provide an overall database service. In a compute service, one or more compute nodes may process queries, which may include engaging in one or more transactions in response to each query. A compute node (e.g., a primary compute node) may write transaction log records to a log file receiver (e.g., a landing zone), which may be part of a log service. A compute node (e.g., a primary compute node) may interact with a storage service by fetching data pages from page servers if the data pages are not found in the local data cache or in a resilient buffer pool extension (RBPEX). A primary compute node (e.g., instance) may write log records (e.g., directly) to storage managed by a log service. The log service may retrieve log records from a log file receiver and make the logs available to page servers and secondary compute nodes. The log service may (e.g., also) offload log records to long-term storage (LTS) to support point-in-time restore (PITR).

A log service may be scalable to hundreds or thousands of clients for each customer of a database system. A log service may serve logs to clients as quickly as possible (e.g., 1 ms or less). A log service may be a resource constrained service with a limited amount of memory and number of CPU (central processing unit) cores to minimize cost. Log service scalability may be based on processing (e.g., threading) scalability, memory scalability, input/output (I/O) scalability, and reliability.

A database may need to be scaled as the number of clients, number of read and/or write queries, amount of data, number of query servers, and/or number of storage devices increases. Such scaling increases costs and may not ultimately be able to support demands on the database adequately. Large numbers of transactions to serve, and the maintenance of all copies of data in the database on many devices, may exhaust the memory, processing threads, and/or input/output (I/O) capabilities of database system devices, which may result in severe performance degradation to overall database performance.

Embodiments disclosed herein overcome these deficiencies of conventional database systems. For instance, in embodiments, asynchronous processing of transaction log requests in a database transaction log service is enabled. A scalable log service may continuously process log requests. Log request processing may be paused and resumed without reducing log service processing capabilities. Log service threads executing a request that pauses may proceed to process other tasks in the same request or tasks for other new or partially processed requests. Any of multiple log service threads may resume processing of a paused request. Requests may be paused by preserving an execution state and deferring the request from a work queue to a deferral queue. Resumed requests may shift from a deferral queue to a work queue following a wait point. A request may be packaged as a data structure that maintains a processing state of the request. A request may be represented as a plurality of execution segments for a plurality of tasks modeled as a plurality of state machines. In some examples, a log service may implement log requests as pausable and resumable segments of execution that can be executed by a pool of worker threads, where segments can execute in parallel, to efficiently utilize CPU resources and minimizing the number of threads and associated costs.

In another embodiment, transaction log requests and transaction logs are consolidated in a database transaction log service. A scalable log service may manage log requests and logs to reduce resource consumption, such as memory and I/O. Log requests may be managed by consolidating (e.g., organizing, merging and/or de-duplicating) the log requests. Transaction log requests may be mapped to read requests for transaction log storage devices in less than a one-to-one ratio. Transaction logs may be managed by using the consolidated log requests to consolidate (e.g., and prefetch) transaction logs from multiple cache and/or storage tiers to a log pool cache. Log requests may be served from the log pool cache. In some examples, a log pool may reduce a memory footprint to a constant factor irrespective of the number of clients (e.g., as opposed to linear growth).

In still another embodiment, transaction log validation is enabled in a database transaction log service. A transaction log service may perform egress validation to confirm transaction logs match previously served transaction logs and are free of corruption. A transaction log service may determine whether a transaction log (e.g., in the form of a log block) was previously served based on transaction log (e.g., log block) identity indicating a position in a logical stream of transaction logs (e.g., log blocks). Egress validation may improve log service reliability by providing an added layer of defense against corruption of a transaction log payload. Egress validation may confirm that, if a log block has been served to any client, any future servings of the same past and present log blocks (e.g., based on identity) have the same image/payload. A (e.g., configurable) history of log blocks that have been served may be tracked (e.g., in an in-memory table) based on their identities, sizes (e.g., in bytes), and a hash of their images. Before being served to a client, the identity of a log block may be looked up in the table and compared to information stored for a previously served log block having the same identity. A discrepancy may prevent a corrupt log block from being served to a client. Egress validation may catch a wider class of coding bugs or hardware defects resulting in silent corruption of transaction log, improving the overall reliability of a log service and integrity of a database for customers.

Such embodiments may be implemented in various configurations of database systems. For instance, FIG. 1 shows a block diagram of a database system 100 that includes a database transaction log service, according to an example embodiment. As shown in FIG. 1, database system 100 includes a query service 110, a log service 120, a data storage 140, a log receiver 160 and log storage 170. Example database system 100 presents one of many possible example implementations. Example database system 100 may comprise any number of computing devices (e.g., including servers), such as example components illustrated in FIG. 1 and other additional or alternative devices not expressly illustrated. Other types of computing environments are also contemplated. The features of database system 100 are described in detail as follows.

In FIG. 1, query service 110, log service 120, data storage 140, log receiver 160 and log storage 170 are shown as communicatively coupled (e.g., interconnected) by connections (shown as arrowed lines). Such connections may include one or more networks (e.g., network(s)). Network(s) may include one or more of any of a local area network (LAN), a wide area network (WAN), a personal area network (PAN), a combination of communication networks, such as the Internet, and/or a virtual network. In an implementation, any one or more of query service 110, log service 120, data storage 140, log receiver 160 and log storage 170 may communicate (e.g., via network(s)) via one or more application programming interfaces (APIs), and/or according to other interfaces and/or techniques. Query service 110, log service 120, data storage 140, log receiver 160 and log storage 170 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Query service 110 may comprise one or more virtual machines, storage devices, servers, operating systems, applications, services, local processes, remote machines, web services, etc. that may be executed, hosted, and/or stored therein or via one or more other computing devices via network(s). Query service 110 may represent (e.g., may be implemented by) any number of computing devices (e.g., query servers, such as primary and secondary compute nodes 116, 112). Query service 110 may be implemented by any type of stationary or mobile computing devices, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Customers may interact with query service 110, which may provide a front end (FE) of a database. As shown in FIG. 1, query service 110 includes one or more primary compute nodes 116 and one or more secondary compute nodes 112. Primary compute node(s) 116 and secondary compute node(s) 112 may each comprise any type of computing device. Primary and secondary compute node(s) 116, 112 may run SQL server or another database server type. An SQL server process may allocate cache for a process. There may be multiple levels of cache, e.g., in memory and on disc.

Primary compute node(s) 116 and secondary compute node(s) 112 may receive and process database queries 102 from one or more client computing devices (not shown). Secondary compute node(s) 112 may be replicas of primary compute node(s) 116. Database queries 102 may read data or write (e.g., change) data. Data may be stored in data storage 140. Primary compute node(s) 116 and secondary compute node(s) 112 may request and receive data 186 (e.g., data pages 144) from data storage 140. Primary compute node(s) 116 and secondary compute node(s) 112 may comprise cache memory/storage (e.g., cache 114, cache 118) to cache copies of portions (e.g., data pages 144) of data stored in data storage 140. Compute nodes may have different cache contents. Cache 114, 118 (e.g., in memory and/or on disk) may be least recently used (LRU) cache to evict cached data and/or logs. Cache in disk may be resilient buffer pool extension (RBPEX) cache. Cache size may be selected or determined based on (e.g., proportional to) the size of the compute node. A customer may choose the size of a compute node (e.g., number of virtual CPU cores).

A customer may choose to connect to primary compute node or a (e.g., specific) secondary compute node. A query on a secondary may touch on different pages than pages touched by a query on the primary or another secondary compute node. Primary compute node(s) 116 may process read and write queries while secondary compute node(s) 112 may process read queries. Queries may include instructions to make one or more changes to a database. A change may be implemented in a primary database. The change may be logged and promulgated to replicate a change (e.g., copy the change) to secondary databases. Primary compute node(s) 116 may generate logs 182 to identify and preserve records of changes to data by write queries. Logs may be provided to log receiver 160. Secondary compute node(s) 112 may access (e.g., request and receive) logs 180 from log service 120 to update cached copies of data pages 144.

Primary and secondary compute node(s) 116, 112 may outsource data to data server(s) 142 (e.g., as opposed to storing data locally) and logs to log storage 170 (e.g., as opposed to storing logs locally). Primary and secondary compute node(s) 116, 112 may keep small subset of data in cache while data server(s) 142 may store all data. Primary and secondary compute node(s) 116, 112 may search for data in compute node cache 118, 114 before searching for the data in data server(s) 142.

As shown in FIG. 1, data storage 140 includes one or more data servers 142. Data server(s) 142 may comprise one or more virtual machines, storage devices, servers, operating systems, applications, services, local processes, remote machines, web services, etc. that may be executed, hosted, and/or stored therein or via one or more other computing devices (e.g., via network(s)). Data server(s) 142 may represent any number of computing devices. Data server(s) 142 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Data server(s) 142 may store and manage database data in the form of data pages 144. Data (e.g., pages) stored by data server(s) 142 may overlap with data (e.g., pages) stored by one or more other data server(s) 142. Data server(s) 142 may receive requests for and serve data 186 to primary compute node(s) 116 and secondary compute node(s) 112. Data server(s) 142 may request and receive logs 192 from log service 120 to maintain (e.g., update) data pages 144.

Data server(s) 142 may be page servers (e.g., in backend (BE) database services). The number of page servers may be scalable. The number of page servers may be proportional to the amount of data, e.g., may increase or decrease with the amount of data (e.g., a large database may have more page servers than a small database). The number of page servers may increase with the amount of data. A database system may detect that it is low on space and provision more page servers to house/store the extra data. Page servers may be located in one or more data centers (e.g., in a region of datacenters). Page servers may be used to distribute customer data (e.g., rather than maintain customer data in a centralized location). Data distribution may support database scaling. Primary and secondary compute node(s) 112, 116 may use page servers as virtualized page store localized page stores. Data pages may be externalized to computes using data server(s) 142 (e.g., page servers). Page servers may receive logs. Page servers keep slices of customer data up to date by replaying change logs.

Data server(s) 142 may outsource data storage (e.g., outside SQL server). Data server(s) 142 may cache data pages. For example, data server(s) 142 may cache (e.g., an entire slice of) data pages while compute nodes 116, 112 may cache a subset of the data service slice. For example, a customer may have 10 TB of data, which may be sliced into 128 GB chunks. Each of several data servers 142 may have a 128 GB chunk data slice (e.g., represented as data pages 144). A data BLOB stored in an external service (e.g., in Azure storage outside SQL server) may correspond to the 128 GB data slice (e.g., data pages 144) stored by a data server 142, for example, so that a copy of externally stored data is available on a locally attached disk for each data server 142 in the form of a respective/corresponding 128 GB slice of data.

Log receiver 160 may be implemented, for example, within primary compute node(s) 116 and/or stand-alone device(s). Log receiver 160 may comprise one or more virtual machines, storage devices, servers, operating systems, applications, services, local processes, remote machines, web services, etc. that may be executed, hosted, and/or stored therein or via one or more other computing devices (e.g., via network(s)). Log receiver 160 may represent any number of computing devices. Log receiver 160 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Log receiver 160 is configured to receive logs 182 from primary compute node(s) 116. Log receiver 160 may store a portion of received logs (e.g., the most recently created logs) 162. Log receiver 160 may provide logs 188 to log storage 170. Log receiver 160 may provide logs 184 to log service 120.

Logs (e.g., database change records) may be grouped into blocks for performance bundling reasons. Each log record may be a description of a change in a database (e.g., a change in a particular data page). A data page may be a payload of customer data. A log record may describe insertion of information into a data page (e.g., table), an update (e.g., a change in a value of data, such as a change in a row of a table), deletion of data (e.g., deletion of a row in a table). Multiple changes to a data page of a customer's data may be bundled or grouped into a block. A block may detail multiple changes based on several mutation/modification queries (e.g., for updates, insertions, deletions). The size of a log block may vary and/or may have a maximum size, such as, for example, 60 kb. Each change record may be relatively small. For example, a deletion record may include a key and a small amount of data to allow a database engine to look up a row and bytes key. A change record for an insert may store an image of what's being inserted (e.g., a row name, age, address). An update may include a pre-update image and a post-update image. A larger row may be segmented to minimize record size. A single change may be segmented into multiple blocks. Database binary large object (BLOB)s may be cut into smaller chunks. Arbitrary sizes may exceed size limitations, so an arbitrary size payload may be segmented into smaller chunks.

Log storage 170 may comprise one or more virtual machines, storage devices, servers, operating systems, applications, services, local processes, remote machines, web services, etc. that may be executed, hosted, and/or stored therein or via one or more other computing devices (e.g., via network(s)). Log storage 170 may represent any number of computing devices. Log storage 170 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Log storage 170 may comprise multiple tiers (e.g., a hierarchy) of storage. For example, log storage 170 may comprise logs stored in local cache (LC) and long term storage (LTS) in various devices with various storage devices. LTS may store all logs while LC may store a portion of all logs. Log storage 170 may comprise multiple devices distributed among multiple locations (e.g., data centers). Log storage 170 may receive logs 188 from log receiver 160. Log storage 170 may maintain (e.g., all) logs 172. Log storage 170 may provide logs 190 to log service 120 (e.g., logs that may not be available from log receiver 160). In some examples, LTS may be external to the database service (e.g., example database service 100). LTS may store logs as one or more BLOBs.

Log service 120 may comprise one or more virtual machines, storage devices, servers, operating systems, applications, services, local processes, remote machines, web services, etc. that may be executed, hosted, and/or stored therein or via one or more other computing devices (e.g., via network(s)). Log service 120 may represent any number of computing devices. Log service 120 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Log service 120 is configured to support data maintenance in database system 100. Log service 120 serves logs to clients or customers, such as secondary compute node(s) 112 and data server(s) 142, which may use the logs to maintain up-to-date data in accordance with changes indicated in logs. Log service 120 may make a secondary copy of logs 172 (e.g., in a log service private store). Log transactions (e.g., by primary compute node(s) 116) may be mirrored. For example, primary compute node(s) 116 may send a message (e.g., a network message over the network) to log service 120 with a copy of the transaction data written to log receiver 160 (e.g., a full payload of the transaction log). A message received by log service 120 may be a notification that primary compute node(s) 116 attempted to write the transaction data (e.g., information) to logs 162. Log service may optimistically cache the transaction data under an assumption that the write to logs 162 is likely to be successful. Log service may await further instruction (e.g., confirmation of successful write) from primary compute node(s) 116 before serving the transaction data to secondary compute node(s) 112 and/or data server(s) 142. Log service 120 may optimistically cache logs to avoid going to log receiver 160 or other log storage device to perform a read to obtain logs or a portion thereof. Log service 120 may store a copy of logs in a memory area (e.g., cache) associated with (e.g., controlled by) log service 120. Log blocks and write confirmations may accumulate. Confirmations may be based on a point in time, covering multiple transaction logs (e.g., rather than confirming one log at a time). Log service 120 may determine which blocks (e.g., cached logs) may be promoted (e.g., served to clients in response to requests for updates) based on write confirmations. Logs may be written again by log service 120 into LTS as a back-up location (e.g., to another location, possibly stored in a different form).

Log service 120 may serve log requests faster by managing requests and logs. Log service 120 may organize and consolidate requests and consolidate a subset of logs for expedited service of requests. Log service 120 may comprise asynchronous process manager 122, log pool manager 130 and log validator 138.

Asynchronous process manager 122 is configured to process log requests (e.g., from secondary compute node(s) 112 and data server(s) 142) asynchronously, for example, to maintain scalability. Requests may be represented and processed as one or more work items (e.g., executable segments). Work items may be processed by threads in a thread pool. Work items may be paused at wait points (e.g., waiting for a log to be produced) and resumed while threads may continue performing work for one or more requests (e.g., as opposed to not performing work during a wait point).

As shown in FIG. 1, asynchronous process manager 122 includes a thread pool 124, a plurality of work queues 126, and a deferral queue 128. Thread pool 124 provides a pool of threads that may be processed by one or more CPU cores. A thread is a component of a process, a thread of execution that contains a sequence of program code instructions that can be managed independently (e.g., by a scheduler of an operating system). Multiple threads can exist within one process, executing concurrently and sharing resources such as memory. A CPU may include multiple cores (a "multi-core processor"), and the CPU can run program code on each of the separate cores at the same time. In this manner, a CPU can use multithreading to run multiple threads of execution concurrently, with each processor core executing one or more threads. Threads may service work items created from log requests. Work queues 126 may queue work items for processing by threads. Threads may become available to handle works items in work queue 126 upon completing or pausing another work item. Deferral queues 128 may queue work items that have been paused (e.g., at a waitpoint). Work items may defer themselves to a deferral queue (e.g., at a waitpoint) and/or may reassign themselves to work queue 126 (e.g., when a waitpoint is resolved).

Log pool manager 130 is configured to manage requests and logs to promote efficient processing, for example, to maintain scalability. Log pool manager 130 may reduce I/O and memory utilized to process log requests. Log pool manager 130 may consolidate log requests and/or logs needed or expected to be needed for log requests.

As shown in FIG. 1, log pool manager 130 includes a request manager 132, a log manager 134, and a log pool cache 136. Request manager 132 is configured to consolidate log requests to eliminate duplicate requests for the same logs. Log manager 134 may consolidate logs, for example, to reduce log retrieval time. Log pool cache 136 may cache logs from multiple log storage tiers (e.g., log receiver 160, LC and LTS).

Log validator 138 is configured to validate logs. As shown in FIG. 1, log validator 138 includes an egress history buffer 139. Log validator 138 may determine whether each log has been previously served to a client (e.g., secondary compute node(s) 112 or data server(s) 142). Log validator 138 may confirm that a requested log matches a previously served log before serving a requested log to ensure data updates match for multiple (e.g., all) copies of data. Log validator may comprise or may read/write from egress history buffer 139.

Egress history buffer 139 may comprise (e.g., configurable) memory set aside for egress validation operations. An egress history buffer may store a (e.g., configurable) recent history of served transaction logs (e.g., log blocks). Memory resources may be reduced by retaining less than a full text or image of each payload for each served transaction log (e.g., log block). For example, an egress history buffer may retain identity information (e.g., an identifier (ID), such as a BSN), a checksum (e.g., 32-bit hash of a transaction log or log block), and a byte size (e.g., a 16-bit payload byte size of the transaction log or log block). Other implementations may retain different information about served transaction logs (e.g., log blocks).

Egress history buffer 139 may be implemented as a ring (e.g., circular) buffer with a hash table overlayed for quick lookup via a BSN key. An egress history buffer may be configured to occupy a fixed memory footprint. An entry in an egress history buffer may be relatively small. For example, an entry may be a BSN (e.g., 8 bytes), a length (e.g., 2 bytes), a checksum (e.g., 4 bytes), and/or relatively minor bookkeeping fields. Memory in a ring buffer may be pre-allocated, which may avoid incurring the cost (e.g., and error modes) of memory allocation at runtime. Hash table entries may (e.g., also) be pre-allocated on a lookaside list (e.g., avoid incurring the cost and error modes of allocation at runtime). The number of entries that will fit in the ring buffer may be known, allowing allocation of the same number of hash entries up front.

Further example operation of example database system 100 and components therein are discussed as follows by way of further examples with reference to FIGS. 2-7.

B. Embodiments for Asynchronous Processing of Transaction Log Requests

Paused, unusable, threads reduce performance and scalability of a log service. In an example of the deleterious effect of threads waiting during wait points, a log request may be near the most recent log data, where a log is not yet available. A log request may fall within an in-memory cache (e.g., broker cache) range. At the end of the range there may not be a log in existence that can be returned (e.g., as is the case on an idle database). A log request may wait for a client-supplied timeout before returning empty handed (or with the most recent log generated if produced during the wait time). A timeout may be, for example, one second. A thread waiting during the wait period may be unusable for the entire period. A timeout may be implemented to minimize network chattiness to avoid frequent back-and-forth messaging between client and server when there is not a log to return. A suspension may quickly lead to thread shortage/exhaustion. Other requests for logs that are available may be starved for want of a thread to process them.

The number of threads may be a multiple of the number of CPU cores. In an example, there may be 10 threads per CPU core (e.g., 40 threads for four cores). Increasing the number of threads to counter paused threads may not be a useful solution. Creating threads proportional to the number of log requests may not scale well. Each thread consumes a portion of memory. A significant number of threads may create significant context switch overhead in a system, and their stack memory may (e.g., quickly) consume (e.g., all) available process memory. For example, a 1 TB database with 16 GB page servers may have 128-page server replicas and 128 threads, which may utilize 256 MB of memory at 2 MB per thread. A 100 TB database with 16 GB page servers may have 12,800-page server replicas and 12,800 threads, which may utilize 25.6 GB of memory at 2 MB per thread.

Requests may be represented by a (e.g., top-level) work item, which may describe the client's request. A work item may be responsible for maintaining its own state or progress in a response processing pipeline. A work item may know how to advance its state. A (e.g., top-level or parent) work item may create one or more child work items, for example, to better manage its state and allow for more concurrency. Child work items may process (e.g., complex) sub-operations, such as performing a broker cache read, which may have its own state management.

Splitting a work item into children may support concurrent execution of portions of the work item by the thread pool (e.g., and it may make reasoning about the work easier). A parent work item (e.g., implemented as a state machine) may suspend itself and remember where it needs to resume from (e.g., its next state) while child work items are running. A child may notify (e.g., signal) a parent when the child completes. A parent may be woken up and moved from the deferral queue back to the work queue in the proper state, visible to the thread pool worker threads when child work items complete execution.

A work item (e.g., parent or child) may determine that it is approaching or near a wait point. The work item may place itself in a deferral queue, which may not be visible to a thread pool. A work item in a deferral queue may occupy memory, but not a thread. A thread becomes available to pick up other work items in a work queue upon deferring a work item.

A deferral queue may be (e.g., periodically) examined for items that are eligible to be awoken (e.g., or resumed). Deferral queue maintenance may be performed in between processing work items, or if/when a state changes that may impact waiting threads (e.g., such as a log being generated). Deferral queue maintenance may be performed to reuse existing threads without creating more threads.

Representing a log request as one or more state machines may support concurrent processing of multiple portions of a request and/or may support efficient use of computing resources by preventing portions of requests from using computing resources (e.g., threads) while waiting for completion in order to advance. In some examples, there may be a common execution function that drives the overall flow of a state machine. A (e.g., each) state machine may perform discrete units of work. A (e.g., each) state in a state machine may represent data. A (e.g., each) transition between states may represent functional, operational, or computational behavior (e.g., of the machine) on the data. Transitions between states in a state machine may occur based on satisfaction of one or more rules, such as receipt of a signal, a timeout, etc. A state machine may indicate the next step to take. For example, a state machine may indicate that the state machine has completed and need not run again, that the state machine should run again (e.g., immediately after changing an internal state of the state machine), that the state machine should be deferred (e.g., with an indication of the state from which to resume), etc.

A thread (e.g., thread 1) may perform a coroutine-aware suspend instead of suspending itself and being unable to perform work (e.g., while waiting for a log to be produced before returning empty handed). A coroutine-aware suspend may include recording a current execution state of a state machine, placing the state machine on a deferral queue, and releasing the thread to pick up the next ready item from the work queue 206. This means that a thread pool thread may always performing useful work (e.g., when work exists), even if there is a wait period for some event to occur. Scalability may be improved because threads are always available to perform work rather than running out of threads as the number of requests and the number of suspended threads waiting on events to wake them up increase.

Figure 2:
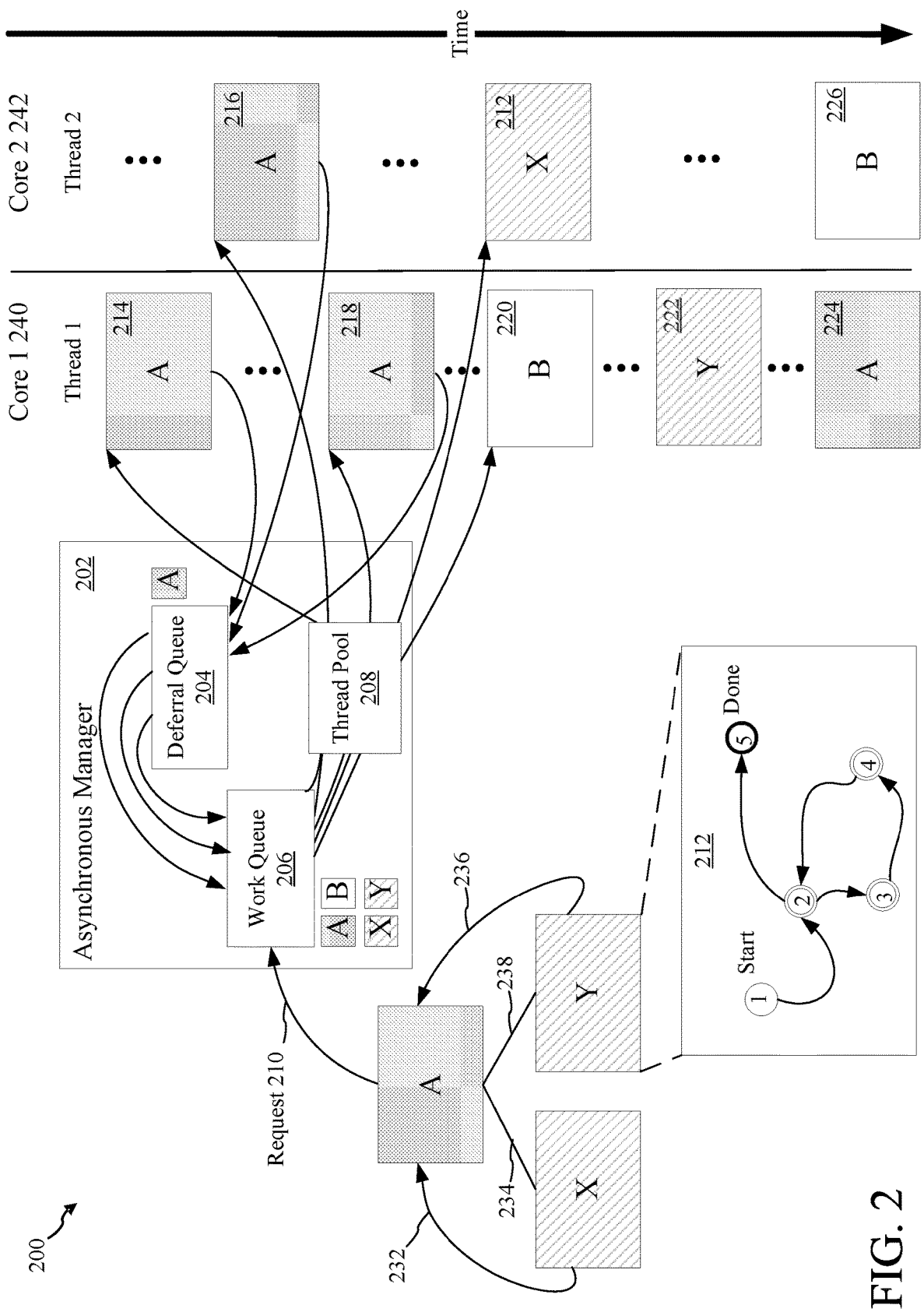
FIG. 2 shows an example system in which asynchronous processing of a log request is performed by a database transaction log service, according to an embodiment.

FIG. 2 shows an example system 200 in which asynchronous processing of a log request is performed by a database transaction log service, according to an embodiment. System 200 may be implemented in database system 100 of FIG. 1 in an embodiment. System 200 shows asynchronous processing implemented by an asynchronous manager 202 (or "asynchronous process manager 202"). Asynchronous manager 202 includes a deferral queue 204, a work queue 206, and a thread pool 208. Asynchronous manager 202 is an example of asynchronous manager 122 of FIG. 1. System 200 shows multiple CPU cores, including core 1 240 and core 2 242, and multiple threads (e.g., thread 1, thread 2) with which asynchronous manager 202 interacts. In various implementations, there may be any number of cores and any number of threads. As previously described in the example shown in FIG. 1, asynchronous manager 202 may include work queue 206, deferral queue 204 and thread pool 208.

Asynchronous manager 202 may receive log requests (e.g., a request 210) from log service 120, which received the request from a client. A request may include information, such as a binary large object (BLOB) sequence number (BSN) or a block sequence number (BSN) for a requested log, a buffer size indicating the amount of space the client has reserved (e.g., over a remote procedure call (RPC)) to accept the response, etc.

Asynchronous manager 202 may generate one or more work items for each log request (e.g., instead of each request being assigned a thread). Work items may be placed in work queue 206. Threads (e.g., thread 1, thread 2) in thread pool 208 may service/handle work items in work queue 206. Threads may become available to handle works items in work queue 206 upon completing or pausing another work item. Threads may be processed by one or more CPU cores (e.g., core 1 240, core 2 242). Work items may defer themselves to deferral queue 204, for example, at a waitpoint. Work items may reassign themselves to work queue 206, for example, if/when a waitpoint is resolved.

System 200 shows asynchronous processing of log request A and log request B. Log request A (e.g., parent request A) is shown with two child requests X and Y. In various implementations, there may be any number of parent requests, each with any number of child requests generated by the parent request and/or internally by log service 120 (e.g., asynchronous manager 202). A log request may be in a message received over a network. Log service 120 (e.g., via asynchronous manager 122 or 202) may determine how to process messages and requests therein. In some examples, log service 120 (e.g., via asynchronous manager 122 or 202) may generate one or more data structures to manage a request in a processing pipeline. For example, a log service request may be packaged as a data structure with information about the state of a request, the state of progress or which state it is in, state variables and storage for an intermediate buffer to write a log in preparation to serve the log upon completion.

In some examples, log service 120 (e.g., asynchronous manager 202) may implement a (e.g., top-level or parent) request (e.g., request A or request B) as one or more state machines. Log service 120 (e.g., asynchronous manager 202) may (e.g., as needed) generate one or more child requests (e.g., represented by one or more state machines) to further decompose a top-level request. As shown in FIG. 2, request A is associated with child requests X and Y. Child request Y is represented by child state machine 212, which is shown with five states 1-5. State 2 is a wait point, waiting for states 3 and 4 to complete.

In the examples shown in FIG. 2, the state machine representing request A begins in work queue 206. Thread 1 in thread pool 208 services a first portion 214 (e.g., one or more execution segment(s)) of state machine A until reaching a first wait point, at which time state machine A defers itself to deferral queue 204. Thread 1 may service other work items in work queue 206 while state machine A is in deferral queue 204. State machine A assigns itself to work queue 206 when the wait point is resolved.

Thread 2 in thread pool 208 services a second portion 216 of state machine A until reaching a second wait point, at which time state machine A defers itself to deferral queue 204. State machine A assigns itself to work queue 206 when the wait point is resolved. Thread 2 may service other work items in work queue 206 while state machine A is in deferral queue 204.

Thread 1 in thread pool 208 services a third portion 218 of state machine A until reaching a third wait point (e.g., branch point 238 from parent request A to child request Y), at which time state machine A defers itself to deferral queue 204. Thread 1 may service other work items in work queue 206 while state machine A is in deferral queue 204. State machine A assigns itself to work queue 206 when the wait point is resolved.

Request B may be received. One or more parent (e.g., and child) state machines may be entered into work queue 206 representing request B. Thread 1 in thread pool 208 services a first portion 220 of state machine B until reaching a first wait point, at which time state machine B defers itself to deferral queue 204 (not shown). Thread 1 may service other work items in work queue 206 while state machine B is in deferral queue 204. State machine B assigns itself to work queue 206 when the wait point is resolved.

The third wait point (e.g., or another wait point) in processing of state machine A may be branch point 234 from parent request A to child request X. Thread 2 in thread pool 208 services child state machine X 212 until completion. For example, child state machine X 212 may be processed without a wait point from state 1 to state 2, state 2 to state 3, state 3 to state 4, state 4 to state 2 and state 2 to state 5. Child request X (e.g., via state machine X 212) may signal 232 completion to parent request A (e.g., via state machine A in deferral queue 204). State machine A may respond to signal 232 by assigning state machine A to work queue 206.

A fourth wait point (e.g., not shown), or another wait point such as the third wait point, in processing of state machine A may be branch point 238 from parent request A to child request Y. Thread 1 in thread pool 208 services child state machine Y 222 until completion. For example, child state machine Y 222 may be processed without a wait point. Child request Y (e.g., via state machine Y 222) may signal 236 completion to parent request A (e.g., via state machine A in deferral queue 204). State machine A may respond to signal 236 by assigning state machine A to work queue 206.

Thread 1 in thread pool 208 services a final portion(s) of state machine A 224 following completion of child state machine X and child state machine Y. Thread 1 may service other work items in work queue 206.

Thread 2 in thread pool 208 services a final portion 226 of state machine B. Thread 2 may service other work items in work queue 206.

As shown by one of many examples in FIG. 2, log service scalability may be improved by decoupling threads from requests. A request may be performed as a set of execution segments, so that when a thread encounters a waitpoint, the state at the waitpoint is remembered, placed in an envelope, and the envelope is placed in a deferral queue to free the thread to process other execution segments for the same request or other requests. A state machine may store where a request paused itself. Performance and scalability may be improved because threads may continue working despite encountered wait points. Execution segments may be processed by any thread, such that a request may be processed by one or more threads, e.g., concurrently or sequentially in whole or in part, e.g., depending on requests. Threads may be multiplexed. Any of multiple threads in a pool of threads may access a work queue and take up/dequeue a new or partially completed request from the work queue. Multiple routines may share the same thread (e.g., similar to a coroutine) instead of single routine or subroutine owning a thread until completion. Routines may be paused at arbitrary points and may continue with partial execution of another coroutine.

In some examples, a state machine may represent a location in a flow. Some implementations may represent a location in application code. Some implementations may use subthreads (e.g., with their own stacks). Some implementations may leverage support built-into an operating system (OS). Threads may be OS primitives, e.g., schedulable units that run on a CPU core. A thread may be provided with a function to execute (e.g., with a thread entry point). A thread sequentially runs through the function (e.g., to a wait point). A CPU may (e.g., concurrently) process multiple threads (e.g., may multiplex between threads). In some examples, log service logic may be built into the function that threads (e.g., or subthreads) are executing. A log service function may be configured to (e.g., know how to) manage work on top of a thread (e.g., and/or subthread). A log service function may indicate that the thread will not wait, but will be freed to perform other work, which may improve thread scalability.

C. Embodiments for Consolidating Transaction Log Requests and Transaction Logs

In embodiments, storage I/O (e.g., read/write) scalability may be improved (e.g., in addition to thread scalability). Requests and logs may be managed to reduce I/O operations. Multi-tier storage of transaction logs (e.g., log receiver 160 and log storage 170) may have limited I/O. A log service (e.g., log service 120) may read from several I/O devices on behalf of clients. I/O devices may include log receiver device(s) (e.g., log receiver 160), which may store logs in a BLOB, local cache (LC) device(s), which may store a local disk file (e.g., on a solid state drive (SSD) device(s)), and long term storage (LTS) device(s), which may include a collection of BLOBs stored on data servers (e.g., data server(s) 142). Each device has limited I/O capability.

The number of transaction log clients (e.g., data server(s) 142 and secondary compute node(s) 112) typically increases with the size of a database and/or the number of database users. For example, the number of data server(s) 142 may number in the hundreds. Each data server may request logs (e.g., from various locations) from a log service (e.g., log service 120). Log service 120 may (e.g., first) attempt to serve transaction logs from in-memory (e.g., RAM) cache (e.g., broker cache). In-memory cache size may be, for example, 10 GB. Other levels/tiers may be accessed to retrieve and serve transaction logs if there is an in-memory cache miss. For example, transaction logs may be accessed in other caches (e.g., a local cache on a locally attached disc, which may be 128 GB) and/or (e.g., if not in other cache) in one or more levels in storage (e.g., a local disc, log receiver 160, log storage 170. Storage devices (e.g., log receiver 160, log storage 170) can incur a large number of reads for transaction logs if a client/customer does a point in time restore (PITR) for a full copy of a database at a selected time. A large number of reads (e.g., for a PITR) may overwhelm storage devices with I/O requests. Log service 120 may (e.g., without storage I/O scalability) indirectly create many (e.g., hundreds or thousands of) reads against data blobs in log storage 170 on behalf of many (e.g., hundreds) of data server(s) 142 requesting transaction logs.

In embodiments, requests are consolidated for I/O scalability. Multiple requests may seek the same or nearby logs (e.g., requests may be in the same neighborhood). Log service 120 may act as a central manager to coalesce (e.g., sort) multiple requests (e.g., into nearby clusters) and deduplicate (e.g., eliminate) or combine (e.g., merge) requests (e.g., instead of blindly generating read requests into a direct 1:1 mapping of one request from a client to one read request to storage). For example, 100 requests may be reduced to one or two requests. Log requests may be sorted according to chronological locations in a log timeline.

Furthermore, logs may be consolidated for I/O scalability. Each log may be available from one or more tiers of cache (e.g., in memory and/or storage) at one or more locations. Logs requested (e.g., and logs predicted to be requested) may be retrieved from various tiers (e.g., local cache, log receiver cache, long-term storage) and consolidated into a (e.g., conglomerate) log pool cache to serve (e.g., most) requests. Log pool cache may be a second-tier cache, where first tier cache may be in-memory (e.g., broker) cache. Prefetching logs may leverage knowledge of log requests. For example, log ranges may be determined, and logs may be retrieved (e.g., by log pool filler threads) based on sorted requests. A log request for an earlier time may be retrieved in a subsequent cycle to avoid discarding read-ahead (e.g., prefetched) cached logs already in a log pool.

Figure 3:
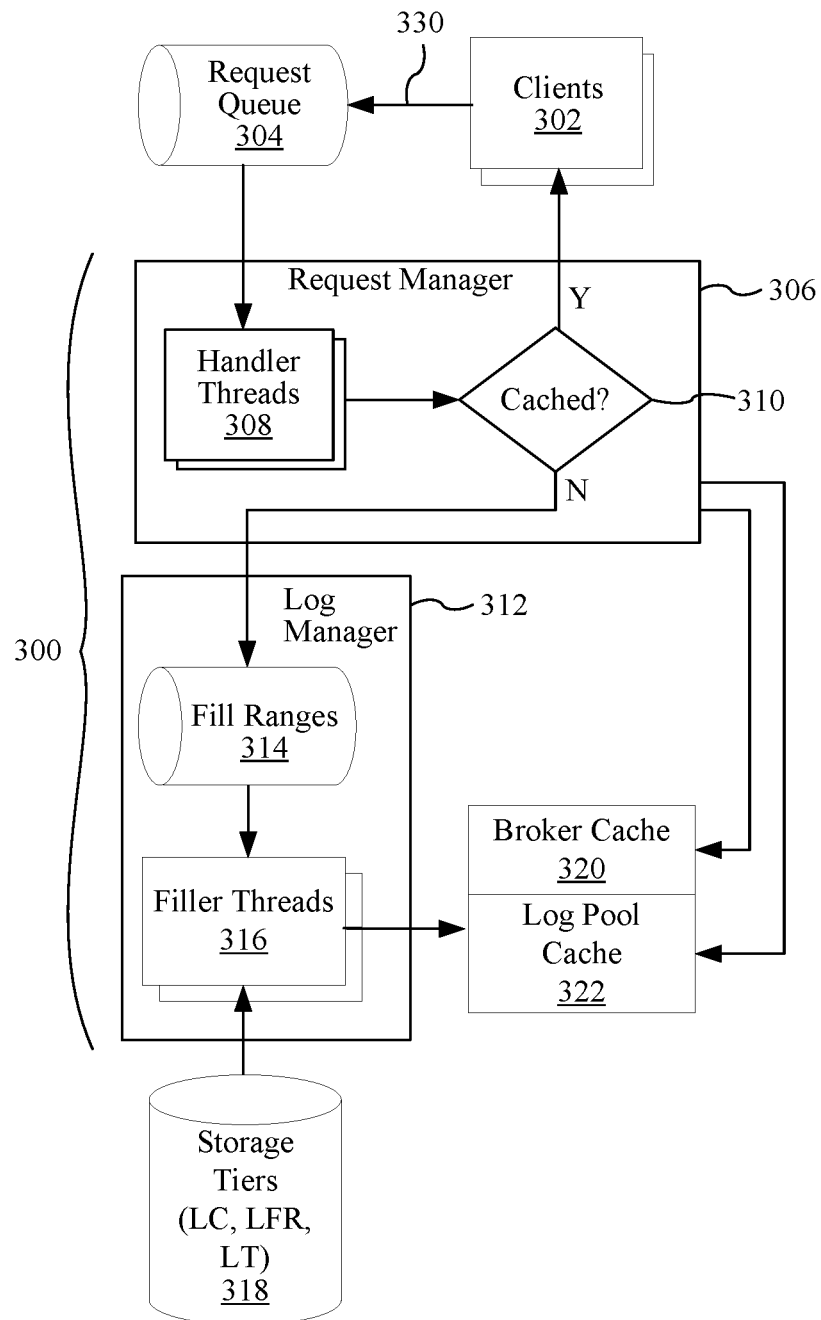
FIG. 3 shows an example of a system configured for log request management and log management by a database transaction log service, according to an embodiment.

FIG. 3 shows a system 340 that includes a log pool manager 300 configured for log request management and log management by a database transaction log service, according to an example embodiment. As shown in FIG. 3, system 300 includes log pool manager 300, one or more clients 302, a request queue 304, storage tiers 318, a broker cache 320, and a log pool cache 322. Log pool manager 300 includes a request manager 306 and a log manager 312. Log pool manager 300 is an example of log pool manager 130 of FIG. 1. Log pool manager 300 shows one of many examples of log request management and log management. The features of system 340, including log pool manager 300, are described in further detail as follows.

Clients 302 (e.g., secondary compute node(s) 112 or data server(s) 142) may generate transaction log requests 330. A (e.g., each) transaction log request 330 may include (e.g., among other things) a BSN for a requested log and/or a buffer size, which may indicate the amount of space the client has reserved (e.g., over a remote procedure call (RPC)) to accept the response. A (e.g., each) log request 330 may be placed in request queue 304. Request manager 306 may manage requests 330. Request manager 306 may sort requests based on transaction log identifiers (e.g., BSNs). Request manager 306 may analyze requests to determine whether log requests are duplicate requests (e.g., seek the same logs or log blocks). Request manager 306 may determine trends in log requests to determine which logs (e.g., or log blocks) to prefetch for expected log requests. Request manager 306 may indicate to log manager 312 log pool cache fill ranges. Request manager 306 may fill a requesting client's buffer with requested logs from broker cache 320 or log pool cache 322 until there is a cache miss in broker cache 320 and log pool cache 322. In some examples, request manager 306 and log manager 312 may be integrated.

A handler thread in a pool of handler threads 308 picks up (e.g., or be assigned) a log request in request queue 304. The handler thread examines the log request to determine which tier stores the requested log. At 310, the thread may (e.g., first) determine whether the log request is located in in-memory cache (e.g., broker cache) 320. Request manager 306 may access and serve the log request from broker cache 320 if the handler thread determines the log request falls within logs stored in broker cache 320. At 310, the thread may (e.g., next) determine whether the log request is located in another in-memory cache (e.g., log pool cache) 322. Request manager 306 (e.g., using a handler thread) may access and serve the log request (e.g., in a response) to a requesting client 302 from log pool cache 322, for example, if the handler thread determines the log request falls within logs stored in log pool cache 322. The handler thread may provide a log fill range to log manager 312, for example, if the handler thread determines that the requested log is not available in broker cache 320 or log pool cache 322.

Log pool manager 300 has a global view of transaction log requests, transaction log broker cache 320 and log pool cache 322 size and contents, log fill ranges 314, storage tiers 318, etc. Log pool manager 300 manages requests, manages responses, manages transaction log fill ranges, and manages reading fill ranges from underlying storage tiers 318 to efficiently minimize resources, such as memory and I/O.

Log manager 312 (e.g., centrally) manages logs. Log manager 312 consolidates logs from multiple transaction log sources (e.g., cache and storage tiers) in multiple devices into log pool cache 322. Log manager 312 may determine which transaction log ranges to cache in log pool cache 322 based on transaction log request information provided by request manager 306. Log manager 312 may receive requests for transaction log fill ranges from handler threads 308. In some examples, request manager 306 (e.g., via handler threads 308) may consolidate fill ranges 314 by inserting and/or merging (e.g., in sorted order) requested fill ranges 314. Log manager 312 may attempt to merge fill ranges provided by handler threads 308 into existing ranges (e.g., when possible) to minimize the length of the list/memory. A transaction log range may be removed from a list as the range starts to be processed.

Many handler threads 308 may request log fill ranges for one or more clients. Requests and/or log ranges may be consolidated by request manager 306 and/or log manager 312 to consolidate requests and fill ranges 314. Request manager 306 and log manager 312 (e.g., which may be combined) operate to consolidate requests and transaction log fill ranges (e.g., by sorting requests or ranges, reordering requests or ranges, merging requests or ranges "in the same neighborhood," eliminating duplicate requests or ranges, and/or the like). Responses to requesting clients may (e.g., also) be consolidated. Log manager 312 updates fill ranges 314 based on received ranges and/or based on predictions. Log pool fill ranges 314 may be retrieved to serve existing log requests and/or may be fetched in advance of predicted log requests, which may be determined from fill ranges in consolidated requests. For example, log manager 312 may predict future transaction log requests and update fill ranges 314 with transaction log ranges that are not yet requested by handler threads 308. Log manager 312 may be aware of the size and contents of log pool cache 322 and current fill ranges sought by filler threads 316. Log manager 312 may delay updating fill ranges 314 if it would evict transaction logs expected to be accessed by handler threads 308 in request manager 306.

Consolidating logs into log pool cache 322 may be distinguished from a synchronous process that tests each log cache or storage tier in succession and responds with a transaction log obtained from the first tier with the content. Log manager 312 separates the process of managing logs from processes fulfilling log requests, which may improve log service scalability. Log manager 312 may queue a request (e.g., internal to log pool service 300) to fetch and cache certain (e.g., selected) ranges.

Log manager 312 may use a set of "filler" threads 316 to fill requested fill ranges 314 and cache them in log pool (e.g., in-memory) cache 322. In some examples, there may be at least one filler thread for each storage tier. An underlying primitive (e.g., an iterator) for each tier may maximize throughput from each tier. More than one thread and iterator per tier may be unnecessary if the iterators are designed to max out a storage device. In the example shown in FIG. 3 with three transaction log storage tiers (e.g., local cache (LC), log file receiver (LFR), and long term (LT)), there may be at least three filler threads 316. Each of the at least one filler thread for each tier may have its own range fill range that may be used to generate read requests. Transaction log requests, transaction logs and/or transaction log range requests may be sorted based on information (e.g., identifiers, such as transaction log BSNs). Sorting may support read-ahead (e.g., pre-fetch) operations by underlying primitives (e.g., iterators) that read from storage tiers 318.

Filler threads 316 may operate in a "scanline" fashion (e.g., using tail of stream (TOS) iterators), which may be visualized as a one-way elevator that "teleports" back to the beginning after completing a cycle in order to avoid request starvation as new fill ranges come into filler ranges 314. Thread fillers 316 may continue (e.g., in sorted order of fill ranges) until the end of a cycle and restart from the beginning instead of immediately acknowledging each new fill range in fill ranges 314. Scanline operation of filler threads may avoid a ping-pong effect between a set of requests "in the middle" of a log transaction range without serving the outer bounds of a fill range.

Filler threads 316 may operate in a "scanline" fashion to (e.g., fully) utilize their read-ahead capability and saturate a storage device. For example, each of three filler threads 316 may own/service one cache tier (LC/LFR/LT) and may maintain a sorted list of ranges that handler threads 308 requested be filled in. A filler thread 316 may zoom as quickly as possible through a list and fill log pool cache 322 from a storage tier 318. Filler thread 316 may not stop and restart a scan if new fill ranges are added to fill ranges 314 prior to completing a scan for current fill range(s) 314. Filler thread 316 may (e.g., only) restart a scan if/when filler thread 316 gets to the end of the fill range list, e.g., starting a new cycle; hence, the name, "scanline" (e.g., as in display rendering). Elevator may be used if read-behind is supported. Restarting a scan every time there is a new request may randomize I/O and discard the read ahead (RA) paid for.

Filler threads 316 may each maintain a sorted list of transaction log ranges to fill. Filler threads 316 may use a TOS iterator as an underlying primitive to do an I/O and read log. A requested range may be transferred (e.g., in a "waterfall" fashion) to a filler thread for the next tier, for example, if a requested range is not found (e.g., the iterator returns "bad address"). TOS iterator I/O failures may be retried multiple (e.g., three) times before giving up.

Request handling thread 308 waits for filler threads 316 to fill log pool cache 322 with a requested fill range. Request handling thread 308 may (e.g., periodically) check log pool cache 322 to determine whether filler threads 316 have filled log pool cache 322 with requested fill ranges. Request handling thread 308 may use log pool cache 322 to fill a response to client 302.

Log pool cache 322 may use costing and eviction rules. Log pool cache 322 may be an in-memory cache with a least recently used (LRU) read content eviction policy. Storage of log blocks and/or virtual log file (VLF) headers of a VLF (a unit of physical log file) may be in the form of a hash table keyed on a BSN. A (e.g., each) hash entry may be refcounted. A reference on a hash entry may be released when a clock algorithm deactivates a descriptor, which may support stability between a descriptor (e.g., an SQL operating system (SOS) user descriptor under an SOS's control) and an associated hash entry, which may be controlled by a (e.g., an external) log service. A ref may (e.g., only) be taken during a (e.g., brief) time the content is memory copied to a caller so that memory reclamation may occur, e.g., under pressure.

Log pool service 300 may be internal or external to database service 100. Log pool service 300 may support I/O and memory scalability. A log service may have a global view of log requests. Log requests may be coalesced, ordered for efficient retrieval, and/or processed centrally to provide scalable, efficient log service to transaction log clients. Many client requests for a transaction log in a "neighborhood" of other requests for a transaction log can may be consolidated to cooperate to reduce resources. Avoiding repeatedly reading the same log may dramatically improve throughput and reduce strain on (e.g., virtual or physical) storage media. Memory utilization may be reduced by avoiding a private scanner (e.g., iterator) on behalf of each client request. A constant number (e.g., one per tier) of iterators may be used irrespective of number of clients. Each iterator may be "heavy weight" because it stores buffers needed for read-ahead. A small, constant-sized, memory footprint may support scaling to many more clients.

Log pool service 300 assists in avoiding a private scan to each storage device. Too many scans may exhaust the I/O capabilities of transaction log storage devices, which may result in a significant degradation of database performance. Memory utilization may be (e.g., dramatically) reduced because each transaction log requester does have its own private memory buffer for reading ahead. Log pool service 300 may perform reading centrally using a set of memory buffers. Memory utilization may be constant irrespective of the number of clients, which may support scaling log pool service 300.

D. Embodiments for a Database Transaction Log Service

Transaction log service scalability may be impacted by reliability. It may be imperative that clients receive the same log free from corruption. Different consumers/clients (e.g., secondary computes, data servers) may request the same log (e.g., or log block) at different times (e.g., to update the data page(s) they store). A log block may be requested and/or used by multiple (e.g., many) different clients because a log block may store multiple transaction logs identifying changes to a variety of different data pages maintained by one or more clients. Transaction logs may be served repeatedly to different clients (e.g., in the form of log blocks) at different times.

According to an embodiment, a transaction log service performs egress validation to confirm transaction logs match previously served transaction logs and are free of corruption. A transaction log service may determine whether a transaction log (e.g., in the form of a log block) was previously served based on transaction log (e.g., log block) identity indicating a position in a logical stream of transaction logs (e.g., log blocks). Egress validation improves log service reliability by providing an added layer of defense against corruption of a transaction log payload. Egress validation may confirm that, if a log block has been served to any client (e.g., and if the client has observed or used the log), any future servings of the same past and present log blocks (e.g., based on identity) have the same image/payload. A (e.g., configurable) history of log blocks that have been served may be tracked (e.g., in an in-memory table) based on their identities, sizes (e.g., in bytes), and a hash of their images. Before being served to a client, the identity of a log block may be looked up in the table and compared to information stored for a previously served log block having the same identity. A discrepancy may prevent a corrupt log block from being served to a client. Egress validation may catch a wider class of coding bugs or hardware defects resulting in silent corruption of transaction log, improving the overall reliability of a log service and integrity of a database for customers. Types of transaction log corruption may include memory corruption, code bugs (e.g., that changed log's identity after being served), hardware bit flip, RAM, power, storage issue(s), and any other issues that may occur in a transaction log service process. Detection of a corrupt log may result in not serving the transaction log and/or other action, such as generating an error flag or message, stopping and restarting a transaction log service, etc.

For example, every time a log block is about to be served, a log service may check cached recent history to determine whether the identity of a log block is already present in the recent history of served log blocks. If so, a checksum may be computed for the block and compared to the checksum for the entry in the recent history to confirm the checksums match. If there is a checksum collision (e.g., a checksum match), a payload size may be determined for the log block and compared to the payload size for the entry in the recent history to confirm the payload sizes match. If both checksum and payload size match then there may be a determination that the log block about to be served is the same as the block previously served, and the log block may be served to a client. If there is a discrepancy, then a flag may be raised. Different implementations may use a different data structure (e.g., different pieces of information) to identify and compare blocks for validation. For example, a log service may store an entire block image (e.g., full copy). In some examples, a cryptographic checksum (e.g., SHA 256) may be used instead of a 32-bit checksum for identity and comparison of previously served log blocks and outgoing log blocks.

Figure 4A:
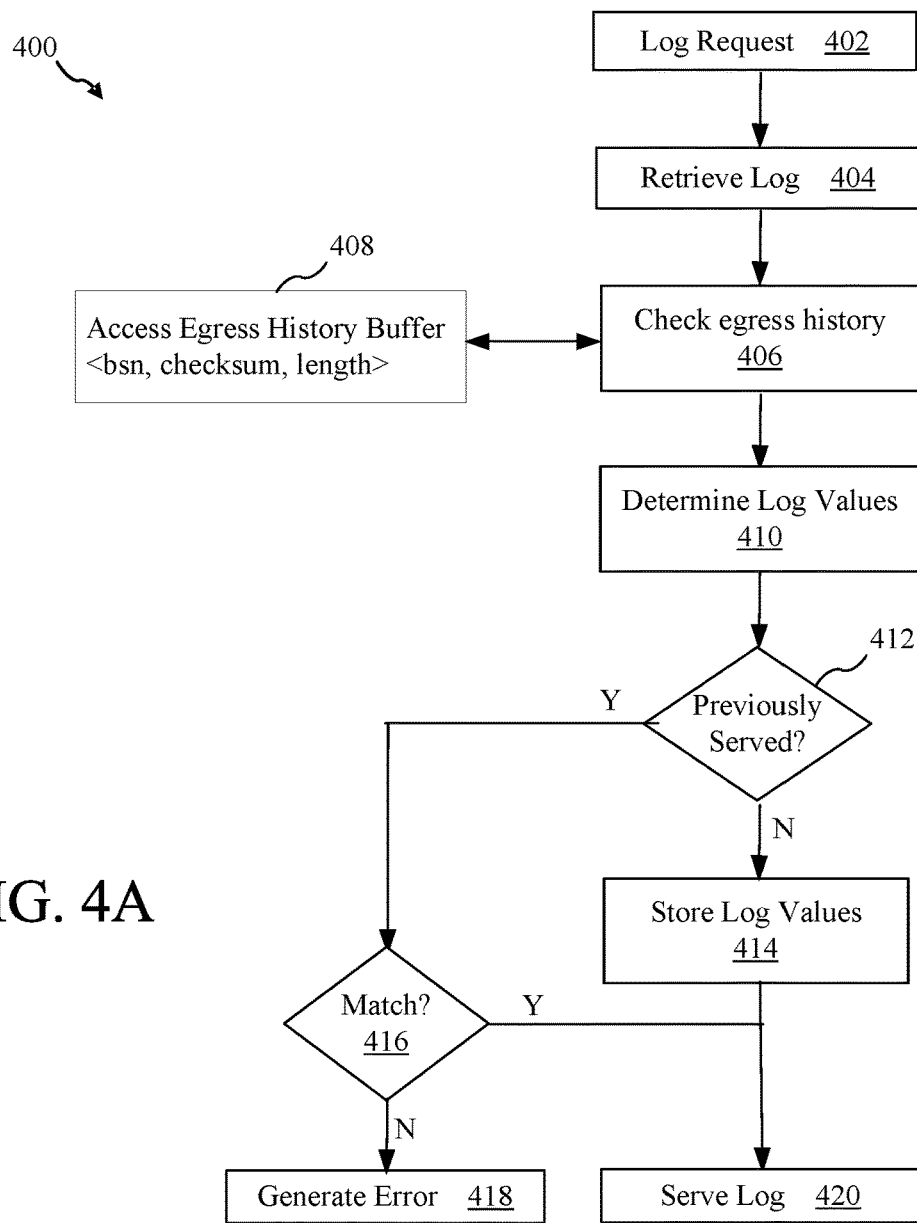
FIG. 4A shows a flowchart of an example method of log request validation by a database transaction log service, according to an embodiment.
Figure 4B:
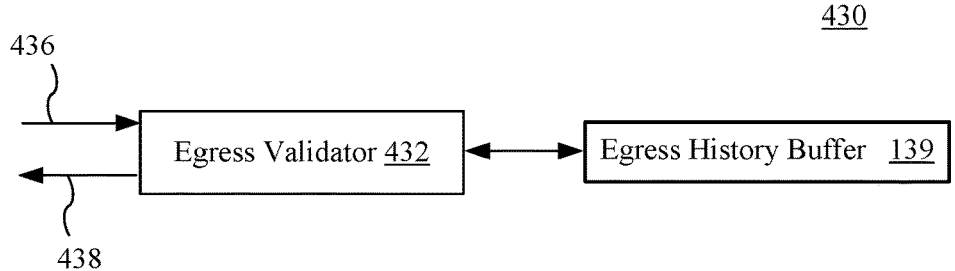
FIG. 4B shows a block diagram of a log request validator, according to an embodiment.

Embodiments for log request validation may be performed in various ways. For instance, FIG. 4A shows a flowchart 400 of an example method of log request validation by a database transaction log service, according to an embodiment. Flowchart 400 provides one or many examples of a egress validation procedure according to embodiments. Flowchart 400 may be performed by log validator 138 of FIG. 1, for example. Flowchart 400 is described with reference to FIG. 1, FIG. 3, and FIG. 4B. FIG. 4B shows a block diagram of a log request validator 430, according to an embodiment. Log request validator 430 is an example of log request validator 138 of FIG. 1. As shown in FIG. 4B, log request validator 430 includes an egress validator 432 and egress history buffer 139. Flowchart 400 and log request validator 430 are described in further detail as follows.

With reference to flowchart 400 in FIG. 4A, in 402, a transaction log request may be received. The transaction log request may be serviced as described elsewhere herein. At 404, a transaction log (e.g., in the form of a log block) may be retrieved pursuant to the transaction log request, e.g., from broker cache 320 or log pool cache 322 of FIG. 3. As shown in FIG. 4B, a transaction log 436 may be retrieved and received by log request validator 430 at egress validator 432.

At 406, before serving transaction log to the requesting client, egress history may be checked to determine whether the transaction log has been previously served to a client. At 408, an egress history buffer, such as egress history buffer 139 of FIG. 1, may be accessed to determine whether the identity (e.g., BSN) of the requested transaction log (e.g., log block) matches a BSN of a previously served transaction log (e.g., log block). For example, as shown in FIG. 4B, egress validator 432 accesses egress history buffer 139 to determine whether retrieved transaction log 436 was previously served, such as by locating a BSN of transaction log 436 in egress history buffer 139.

In an embodiment, egress history buffer 139 comprises configurable memory set aside for egress validation operations. Egress history buffer 139 may store a (e.g., configurable) recent history of served transaction logs (e.g., log blocks). Memory resources may be reduced by retaining less than a full text or image of each payload for each served transaction log (e.g., log block). For example, egress history buffer 139 may retain identity information (e.g., an identity (ID), such as a BSN), a checksum (e.g., 32-bit hash of a transaction log or log block), and a byte size (e.g., a 16-bit payload byte size of the transaction log or log block). Other implementations may retain different information about served transaction logs (e.g., log blocks).

Egress history buffer 139 may be implemented as a ring (e.g., circular) buffer with a hash table overlayed for quick lookup via a BSN key. Egress history buffer 139 may be configured to occupy a fixed memory footprint. An entry in egress history buffer 139 may be relatively small. For example, an entry may be a BSN (e.g., 8 bytes), a Length (e.g., 2 bytes), a Checksum (e.g., 4 bytes), plus relatively minor bookkeeping fields. Memory in a ring buffer may be pre-allocated, which may avoid incurring the cost (e.g., and error modes) of memory allocation at runtime. Hash table entries may (e.g., also) be pre-allocated on a lookaside list (e.g., avoid incurring the cost and error modes of allocation at runtime). The number of entries that will fit in the ring buffer may be known, allowing allocation of the same number of hash entries up front.

At 410 a checksum and length may be determined for the requested transaction log (e.g., log block). For example, in an embodiment, egress validator 432 may be configured to determine a checksum and/or length of transaction log 436.

At 412, a determination is made whether the requested transaction log (e.g., log block) was previously served (e.g., based on whether there is a matching BSN in the egress history buffer). If the requested transaction log (e.g., log block) was not previously served to a client, at 414 the log values (e.g., checksum and length determined at 410) and BSN for the requested transaction log (e.g., log block) may be stored as an entry in the egress history buffer at 408 and the requested transaction log (e.g., log block) may be served to the requesting client at 420. If the requested transaction log (e.g., log block) was previously served to a client, at 416, the checksum and length of the requested transaction log may be compared to the checksum and length of the previously served transaction log.

For example, if egress validator 432 determines from egress history buffer 139 that transaction log 436 was not previously served, egress validator 432 may store the log values and identifier for transaction log 436 in egress history buffer 139, and operation of egress validator 432 may proceed to 420. If egress validator 432 determines from egress history buffer 139 that transaction log 436 was previously served, operation of egress validator 432 may proceed to 416.

At 416, if the requested transaction log (e.g., log block) and previously served transaction log (e.g., log block) match, at 420 the requested transaction log (e.g., log block) may be served to the requesting client. If the requested transaction log (e.g., log block) and previously served transaction log (e.g., log block) do not match, at 418 an error may be generated. A mismatch may be deemed a corrupt block. An alert event may be generated. The transaction log service (e.g., log service 120 of FIG. 1) may determine it is in an undefined state with portions of memory corrupted or in question. The transaction log service may shut down and restart.

For example, as shown in FIG. 4B, egress validator 432 is configured to determine whether transaction log 436 matches the previously served transaction log. Egress validator 432 may perform this determination by comparing the checksum and length of retrieved transaction log 436 to the checksum and length of the previously served transaction log. If egress validator 432 determines a match, operation of egress validator 432 proceeds to 420. If egress validator 432 does not determine a match, operation of egress validator 432 proceeds to 418.

At 418, an error is generated. For instance, a mismatch determined by egress validator 432 at 416 may indicated a corrupt block. An alert event may be generated by egress validator 432 in a serve indication 438. The transaction log service (e.g., log service 120 of FIG. 1) may determine it is in an undefined state with portions of memory corrupted or in question. The transaction log service may shut down and restart.

At 420, egress validator 432 may generate a serve indication 438 that indicates transaction log 436 may be served to the requesting client.

Accordingly, egress validation may confirm that a transaction log (e.g., log block) with a given identity that has been previously served matches a current version of the transaction log (e.g., log block) prior to serving a client requesting the transaction log. A match may be determined to be bit-for-bit identical (e.g., based on identical values of checksum and length), which may be a relatively inexpensive check that can run with low overhead. A checksum may be cryptographic. The size of an egress history buffer may determine the scope of egress validation. Furthermore, egress validation using the relatively smaller history buffer of egress history buffer 139 may detect fewer mismatches.

E. Further Operational Embodiments

Implementations are not limited to the examples described above. Example database system 100 or components therein, and/or other systems and components in other examples may further operate according to examples presented in FIGS. 5-7.

Figure 5:
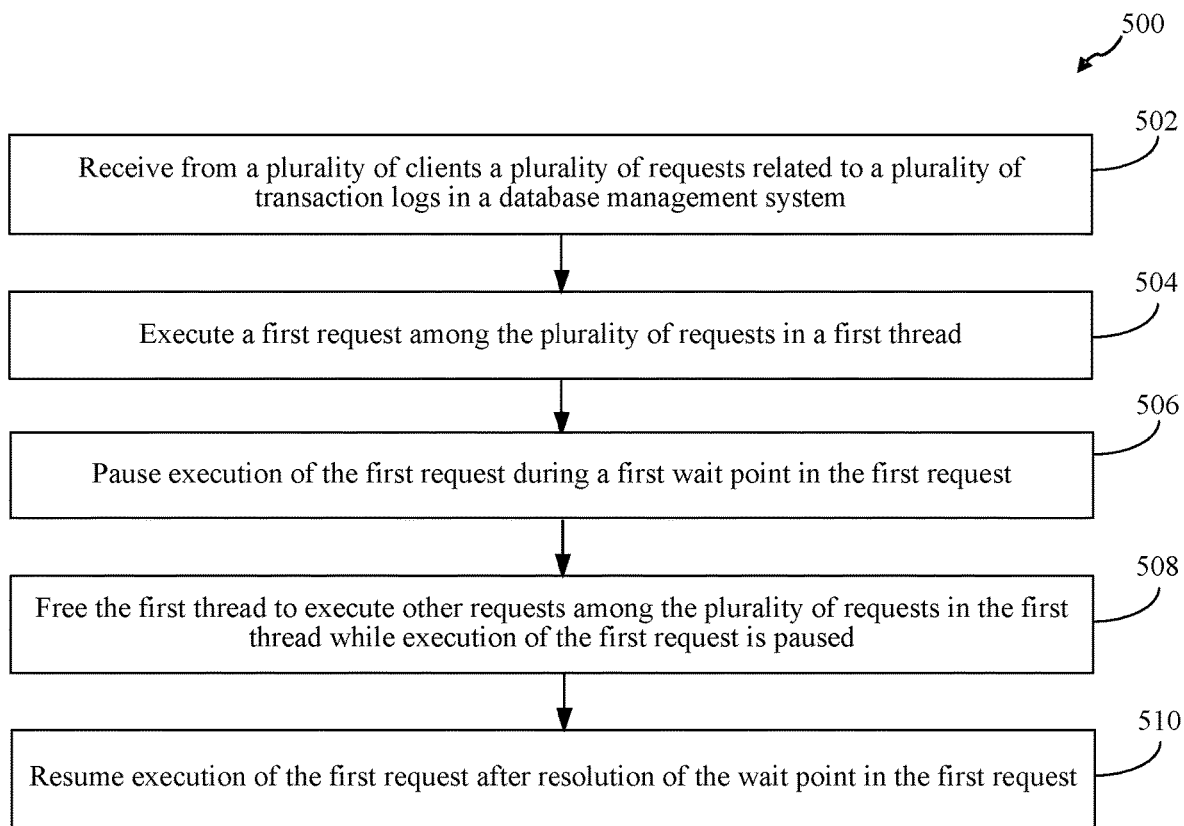
FIG. 5 shows a flowchart of an example method for asynchronous processing of a log request by a database transaction log service, according to an example embodiment.

For instance, FIGS. 1 and 2 described above relate to the asynchronous processing of transactions. Such embodiments for asynchronous processing of transactions may operate in various ways. For example, FIG. 5 shows a flowchart 500 of a method for asynchronous processing of a log request by a database transaction log service, according to an embodiment. Flowchart 500 comprises steps 502-510. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

With reference to flowchart 500 in FIG. 5, in step 502, a plurality of requests may be received from a plurality of clients. The requests may be related to a plurality of transaction logs in a database management system. For example, as shown in FIG. 1, secondary compute node(s) 112 may make a plurality of requests 180 for a plurality of transaction logs from log service 120. As shown in FIG. 1, data server(s) 142 may make a plurality of requests 192 for a plurality of transaction logs from log service 120. As shown in FIG. 2, requests 210 may be received from secondary compute node(s) 112 and/or data server(s) 142.

In step 504, a first request among the plurality of requests may be executed in a first thread. For example, as shown in FIG. 1, a thread in thread pool 124 may pick up or be assigned a request 180 or 192 from work queue 126, and the thread may be executed in a core of a CPU. As shown in FIG. 2, thread 1 in thread pool 208 may pick up or be assigned request A from work queue 206 and request A in thread 1 may be executed by first core CORE 1 in a CPU.

In step 506, execution of the first request may be paused during a first wait point in the first request. For example, as shown in FIG. 1, execution of request 180 or 192 via a thread in thread pool 124 may be paused by placing request 180 or 192 in deferral queue 128. As shown in FIG. 2, request A may be placed in deferral queue 204.

In step 508, the first thread may be free to execute other requests among the plurality of requests in the first thread while execution of the first request is paused. For example, as shown in FIG. 1, the thread used to execute request 180 or 192 may be used to execute other requests, including while the paused thread is in deferral queue 128. As shown in FIG. 2, thread 1 may be used to execute other requests in work queue 206, including while request A is paused in deferral queue 204.

In step 510, execution of the first request may be resumed after resolution of the wait point in the first request. For example, as shown in FIG. 1, a paused, partially executed request may be moved from deferral queue 128 to work queue 126 and any of multiple threads in thread pool 124 may pick up or be assigned the resumed, partially executed request for continued execution.

Figure 6:
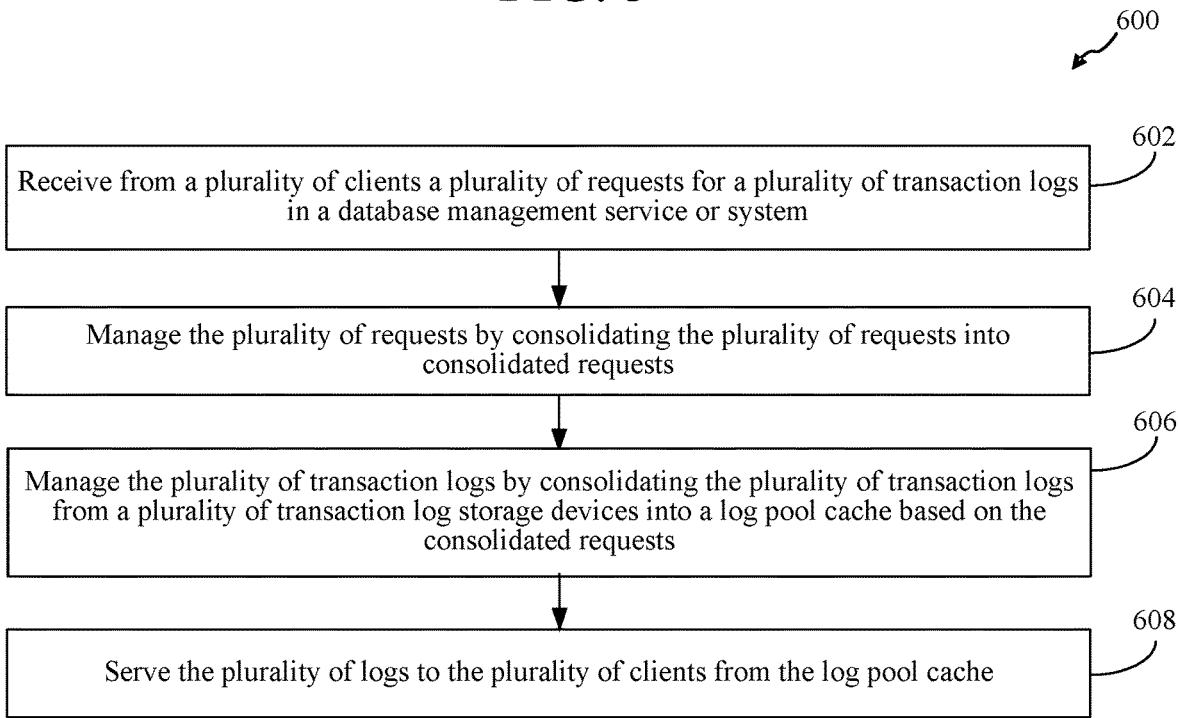
FIG. 6 shows a flowchart of an example method for log request management and log management by a database transaction log service, according to an example embodiment.

FIGS. 1 and 3 described above relate to consolidating transaction log requests and transaction logs. Embodiments for consolidating transaction log requests and transaction logs may also operate in various ways. For instance, FIG. 6 shows a flowchart 600 of an example method for log request management and log management by a database transaction log service, according to an embodiment. Flowchart 600 comprises steps 602-608. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

With reference to flowchart 600 in FIG. 6, in step 602, a plurality of requests may be received from a plurality of clients. The requests may be related to a plurality of transaction logs in a database management system. For example, as shown in FIG. 1, secondary compute node(s) 112 may make a plurality of requests 180 for a plurality of transaction logs from log service 120. As shown in FIG. 1, data server(s) 142 may make a plurality of requests 192 for a plurality of transaction logs from log service 120. As shown in FIG. 3, requests 330 may be received from clients 302 (e.g., secondary compute node(s) 112 and/or data server(s) 142).

In step 604, the plurality of requests may be managed by consolidating the plurality of requests into consolidated requests. For example, as shown in FIG. 1, request manager 132 may manage the plurality of requests 180, 192 by sorting them, combining them, removing duplicates, etc. to consolidate the number of requests. As shown in FIG. 3, request manager 306 may consolidate requests in request queue 304 by sorting them, combining them, removing duplicates, etc. to consolidate the number of requests.

In step 606, the plurality of transaction logs may be managed by consolidating the plurality of transaction logs from a plurality of transaction log storage devices into a log pool cache based on the consolidated requests. For example, as shown in FIG. 1, log manager 134 may manage the plurality of transaction logs that are no longer in in-memory (e.g., broker) cache by consolidating transaction logs in multiple tiers (e.g., logs 162, logs 172) in log pool cache 136. As shown in FIG. 3, filler threads 316 in log manager 312 may consolidate transaction log (e.g., log block) fill ranges 314 (that are not in broker cache 320) from storage tiers 318 (e.g., LC, LFR, LT) in log pool cache 322.

In step 608, the plurality of logs may be served to the plurality of clients from the log pool cache. For example, as shown in FIG. 1, log service 120, via log pool manager 130, may serve logs from log pool cache 136 to secondary compute node(s) 112 and/or data server(s) 142 (e.g., as opposed to serving transaction logs from log receiver 160, log storage 170 or other tiers). As shown in FIG. 3, request manager 306 (e.g., via handler threads 308) may serve transaction logs to clients 302 from log pool cache 322.

Figure 7:
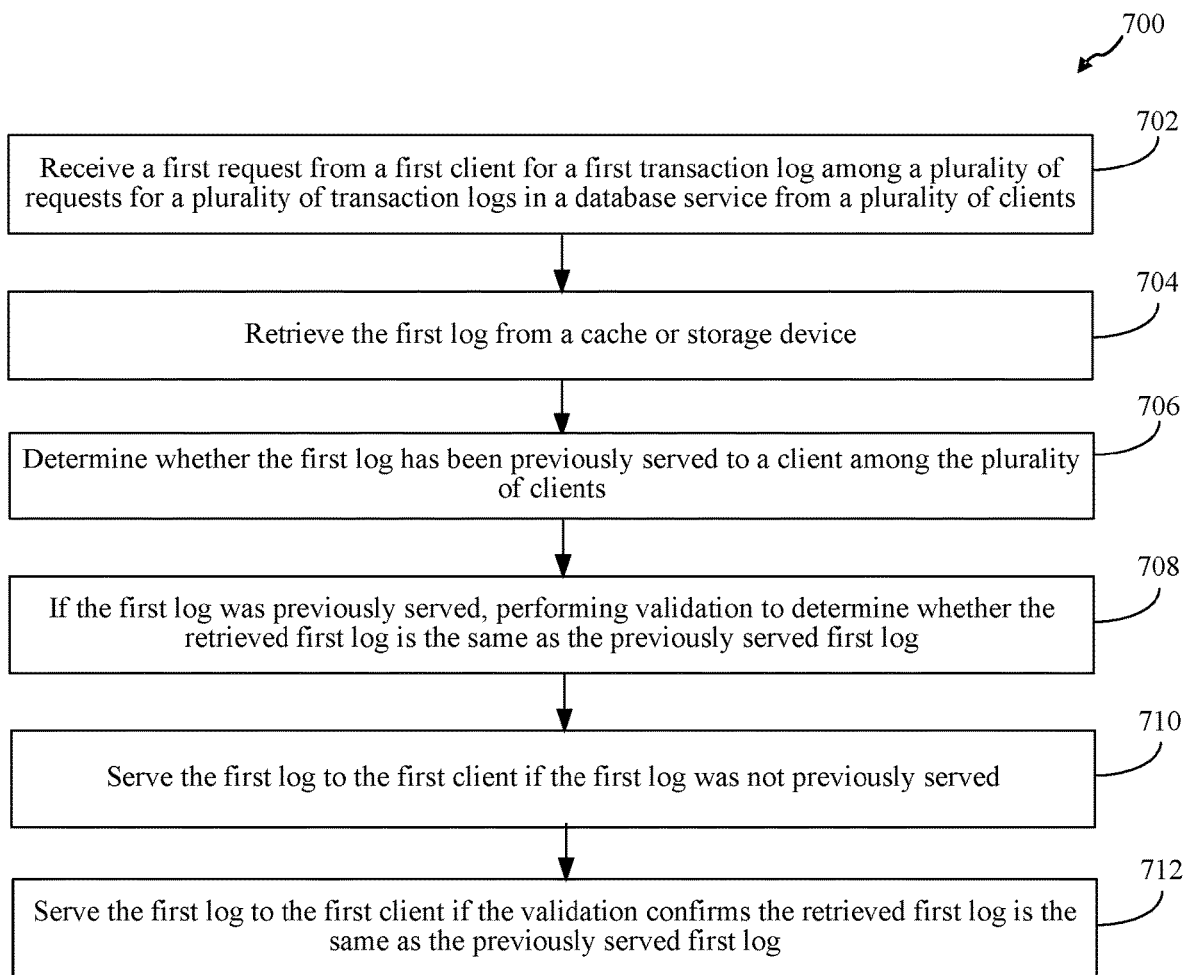
FIG. 7 shows a flowchart of an example method for log request validation by a database transaction log service, according to an embodiment.

Still further, FIGS. 1 and 4 described above relate to transaction log validation. Such embodiments for transaction log validation may also operate in various ways. For instance, FIG. 7 shows a flowchart 700 of an example method for log request validation by a database transaction log service, according to an example embodiment. Flowchart 700 comprises steps 702-712. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

With reference to flowchart 700 in FIG. 7, in step 702, receive a first request from a first client for a first transaction log among a plurality of requests for a plurality of transaction logs in the database service from a plurality of clients. For example, as shown in FIG. 1, secondary compute node(s) 112 may make a plurality of requests 180 for a plurality of transaction logs from log service 120. As shown in FIG. 1, data server(s) 142 may make a plurality of requests 192 for a plurality of transaction logs from log service 120. As shown in FIG. 3, transaction log request 402 may be received from a client (e.g., secondary compute node(s) 112 and/or data server(s) 142).

In step 704, the first log may be retrieved from a cache or storage device. For example, as shown in FIG. 1, log service 120, via log pool manager 130, may retrieve logs from log pool cache 136 based on a request from secondary compute node(s) 112 and/or data server(s) 142 (e.g., as opposed to serving transaction logs from log receiver 160, log storage 170 or other tiers). As shown in FIG. 4A, a log may be retrieved.

In step 706, a determination may be made whether the first log has been previously served to a client among the plurality of clients. For example, as shown in FIG. 1, log validator 138 (or log validator may check egress history buffer 139 to determine whether a log retrieved from log pool cache 136 was previously served by log service 120 to secondary compute node(s) 112 or data server(s) 142. As shown in FIGS. 4A and 4B, egress validator 432 may check egress history 406 by looking for a BSN for the retrieved log in egress history buffer 408. At 412, a determination may be made whether the retrieved transaction log was previously served based on whether the retrieved transaction log's BSN was located in egress history buffer 408.

In step 708, validation may be performed to determine whether the retrieved first log is the same as the previously served first log if the first log was previously served. For example, as shown in FIG. 1, log validator 138 may perform validation by comparing information for the retrieved transaction log to information for a previously served transaction log with the same BSN in egress history buffer 139 to determine whether the transaction log retrieved from log pool cache 136 matches the previously served transaction log. As shown in FIG. 4A, at 416, egress validator 432 may determine whether the checksum and length of the retrieved transaction log matches the checksum and length for the entry in egress history buffer 408 with a BSN that matches the BSN of the retrieved transaction log.

In step 710, the first log may be served to the first client if the first log was not previously served. For example, as shown in FIG. 1, log service 120, via log pool manager 130, may serve the transaction log retrieved from log pool cache 136 to a client (e.g., secondary compute node(s) 112 and/or data server(s) 142) if egress validator 432 indicates the retrieved log was not previously served to a client (e.g., secondary compute node(s) 112 and/or data server(s) 142). As shown in FIG. 4A, at 420 (following 412) egress validator 432 may indicate that the retrieved log may be served to the requesting client(s).

In step 712, the first log may be served to the first client if the validation confirms the retrieved first log is the same as the previously served first log. For example, as shown in FIG. 1, log service 120, via log pool manager 130, may serve the transaction log retrieved from log pool cache 136 to a client (e.g., secondary compute node(s) 112 and/or data server(s) 142) if egress validator 432 indicates the retrieved log was not previously served to a client (e.g., secondary compute node(s) 112 and/or data server(s) 142). As shown in FIG. 4A, at 420 (following 416) egress validator 432 may indicate that the retrieved log may be served to the requesting client(s).

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
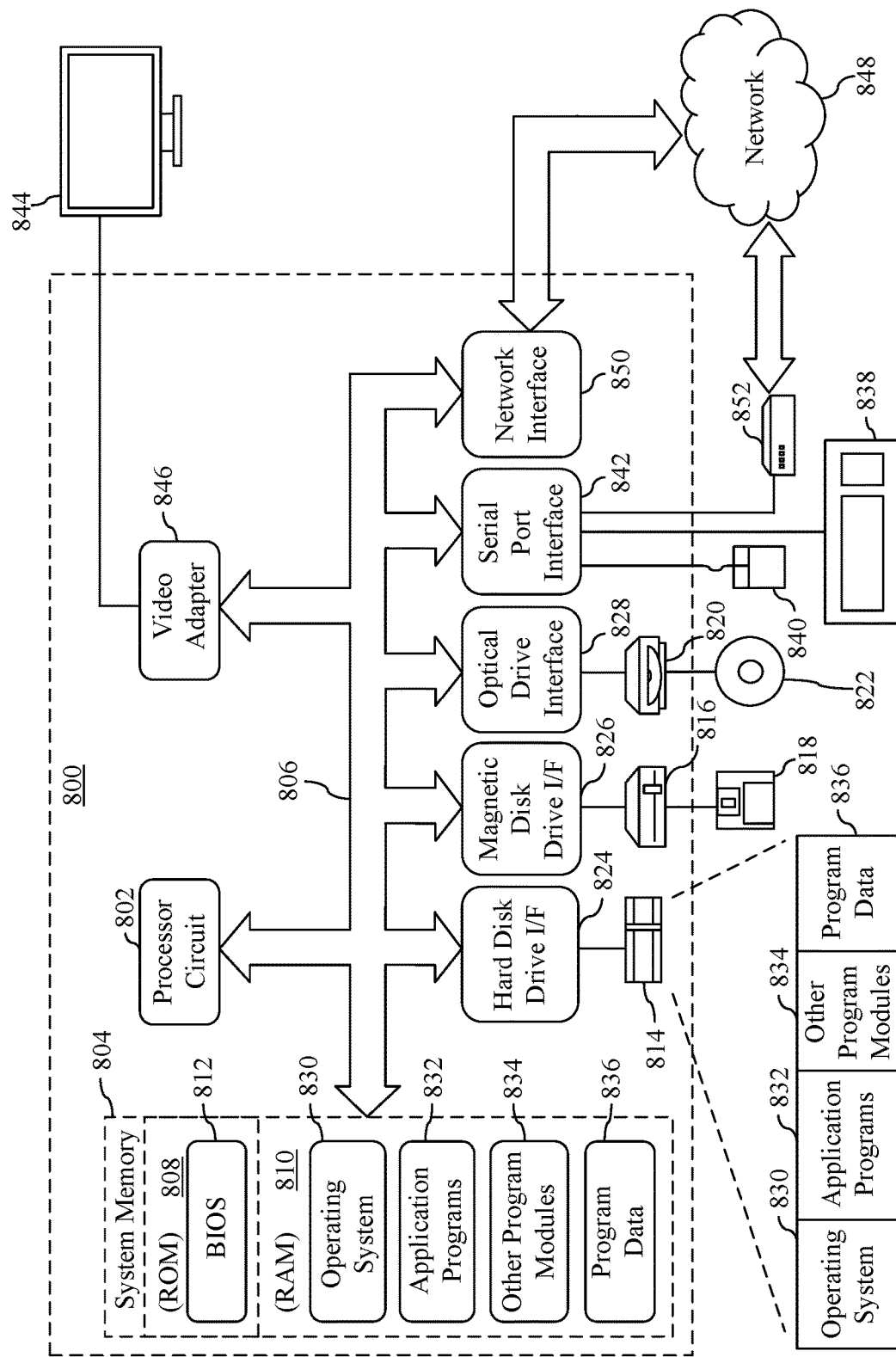
FIG. 8 shows a block diagram of an example computing device that may be used to implement example embodiments.

FIG. 8 shows an exemplary implementation of a computing device 800 in which example embodiments may be implemented. Consistent with all other descriptions provided herein, the description of computing device 800 is a non-limiting example for purposes of illustration. Example embodiments may be implemented in other types of computer systems, as would be known to persons skilled in the relevant art(s). Computing device 800 may comprise an implementation of any one of query service 110, log service 120, data storage 140, log receiver 160, log storage 170, and/or components or subcomponents shown in FIGS. 2-7.

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include computer program logic (e.g., computer program code or instructions) for implementing any of the components shown in FIG. 1 (e.g., database service 100, query service 110, log service 120, data storage 140, log receiver 160, log storage 170, and/or components or subcomponents shown in FIGS. 2-7), any of the operations shown in diagrams depicted in FIGS. 3-5, and any of the steps of the flowcharts depicted in FIGS. 4A and 5-7.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

Methods, systems and computer program products are provided for consolidating transaction log requests and transaction logs in a database transaction log service. A scalable log service may manage log requests and logs to reduce resource consumption, such as memory and I/O. Log requests may be managed by consolidating (e.g., organizing, merging and/or de-duplicating) the log requests. Transaction log requests may be mapped to read requests for transaction log storage devices in less than a one-to-one ratio. Transaction logs may be managed by using the consolidated log requests to consolidate (e.g., and prefetch) transaction logs from multiple cache and/or storage tiers to a log pool cache. Log requests may be served from the log pool cache. In some examples, a log pool may reduce a memory footprint to a constant factor irrespective of the number of clients (e.g., as opposed to linear growth).

In examples, a system for consolidating transaction log requests and transaction logs in a database transaction log service may comprise one or more processors; and one or more memory devices that store program code configured to be executed by the one or more processors, the program code comprising a transaction log manager (e.g., in a log service) configured to: receive from a plurality of clients (e.g., data servers) a plurality of requests for a plurality of transaction logs in a database management service or system; manage the plurality of requests by consolidating the plurality of requests into consolidated requests; manage the plurality of transaction logs by consolidating the plurality of transaction logs from a plurality of transaction log storage devices into a log pool cache based on the consolidated requests; and serve the plurality of transaction logs to the plurality of clients from the log pool cache.

In some examples, the plurality of clients may comprise data servers and data query servers.

In some examples, the system may (e.g., further) comprise the log pool cache. The transaction log manager may be (e.g., further) configured to: determine whether the log pool cache comprises logs that satisfy the consolidated requests; and if the log pool cache does not comprise logs that satisfy the consolidated requests, use filler threads to fill the log pool cache from the plurality of transaction log storage devices.

In some examples, the plurality of transaction log storage devices may comprise multiple tiers of storage. In some examples, consolidating the plurality of transaction logs may comprise retrieving each of the plurality of transaction logs from one of the multiple tiers of storage.

In some examples, the multiple tiers of storage may comprise at least two of a local cache (e.g., local SSD or disc), a recently-created log file cache (e.g., remote SSD or disc), or a long term storage (e.g., remote SSD or disc).

In examples, a method for consolidating transaction log requests and transaction logs in a database transaction log service may be performed by a database service executing on at least one computing device. The method may comprise receiving from a plurality of clients (e.g., data servers) a plurality of requests for a plurality of transaction logs in the database service; consolidating the plurality of requests into consolidated requests; consolidating the plurality of transaction logs from a plurality of transaction log storage devices into a log pool cache based on the consolidated requests; and serving the plurality of logs to the plurality of clients from the log pool cache.

In some examples, consolidating the plurality of requests may comprise, sorting requests in the plurality of requests.

In some examples, sorting (e.g., or reordering) at least some of the plurality of requests may be based on a transaction or log time or chronology indicated in the plurality of requests.

In some examples, consolidating the plurality of requests may comprise mapping the plurality of requests to read requests to at least one of the plurality of transaction log storage devices in less than a one-to-one ratio.

In some examples, consolidating the plurality of requests may comprise combining at least some of the plurality of requests.

In some examples, consolidating the plurality of requests may comprise de-duplicating requests in the plurality of requests.

In some examples, the plurality of transaction log storage devices may comprise multiple tiers of storage. In some examples, consolidating the plurality of transaction logs may comprise retrieving each of the plurality of transaction logs from one of the multiple tiers of storage.

In some examples, serving the plurality of transaction logs to the plurality of clients from the log pool cache may comprise serving a log in the plurality of transaction logs to a client in the plurality of clients out of order in the plurality of requests based on logs in the log pool cache.

In some examples, a method may (e.g., further) comprise prefetching a transaction log for the log pool cache based on the consolidated requests.

In examples, a computer-readable storage medium may have program instructions recorded thereon that, when executed by a processing circuit, perform a method comprising receiving from a plurality of clients a plurality of requests for a plurality of transaction logs in a database management service or system; consolidating the plurality of requests into consolidated requests; consolidating the plurality of transaction logs from a plurality of transaction log storage devices into a log pool cache based on the consolidated requests; and serving the plurality of transaction logs to the plurality of clients from the log pool cache.

In some examples, consolidating the plurality of requests may comprise at least one of the following: sorting requests in the plurality of requests; mapping the plurality of requests to read requests to at least one of the plurality of transaction log storage devices in less than a one-to-one ratio; combining at least some of the plurality of requests; or de-duplicating requests in the plurality of requests.

In some examples, sorting requests may be based on a transaction or log time or chronology indicated in the plurality of requests.

In some examples, the plurality of transaction log storage devices may comprise multiple tiers of storage. In some examples, consolidating the plurality of transaction logs may comprise retrieving each of the plurality of transaction logs from one of the multiple tiers of storage.

In some examples, serving the plurality of transaction logs to the plurality of clients from the log pool cache may comprise, for examples, serving a log in the plurality of transaction logs to a client in the plurality of clients out of order in the plurality of requests based on logs in the log pool cache.

In some examples, the method may (e.g., further) comprise prefetching a transaction log for the log pool cache based on the consolidated requests.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
one or more processors; and
one or more memory devices that store program code configured to be executed by the one or more processors, the program code comprising a transaction log manager configured to:
receive from a plurality of clients a plurality of client requests for a plurality of transaction logs in a database management service or system;
maintain a sorted list of transaction log identifiers that identify the plurality of transaction logs requested by the plurality of clients;
generate a plurality of consolidated requests, each consolidated request identifying transaction logs corresponding to a range of transaction log identifiers in the sorted list;
retrieve, from a plurality of transaction storage devices, the transaction logs identified in the consolidated requests;
consolidate the transaction logs retrieved from the plurality of transaction log storage devices into a log pool cache; and
serve the plurality of transaction logs to the plurality of clients from the log pool cache.

2. The system of claim 1, wherein the plurality of clients comprise data servers and data query servers.

3. The system of claim 1, the system further comprising:
the log pool cache; and
wherein the transaction log manager is further configured to:
determine whether the log pool cache comprises logs that satisfy the consolidated requests; and
if the log pool cache does not comprise logs that satisfy the consolidated requests, use filler threads to fill the log pool cache from the plurality of transaction log storage devices.

4. The system of claim 1, wherein the plurality of transaction log storage devices comprise multiple tiers of storage, and wherein retrieving the transaction logs identified in the consolidated requests comprises:
retrieving each of the transaction logs from one of the multiple tiers of storage.

5. The system of claim 4, wherein the multiple tiers of storage comprise at least two of a local cache, a recently-created log file cache, or a long term storage.

6. A method performed by a database service executing on at least one computing device, the method comprising:
receiving from a plurality of clients a plurality of client requests for a plurality of transaction logs in the database service;
maintaining a sorted list of transaction log identifiers that identify the plurality of transaction logs requested by the plurality of clients;
generating a plurality of consolidated requests, each consolidated request identifying transaction logs corresponding to a range of transaction log identifiers in the sorted list;
retrieving, from a plurality of transaction storage devices, the transaction logs identified in the consolidated requests;
consolidating the transaction logs retrieved from the plurality of transaction log storage devices into a log pool cache; and
serving the plurality of logs to the plurality of clients from the log pool cache.

7. The method of claim 6, wherein said maintaining a sorted list comprises:
sorting transaction log identifiers from the plurality of client requests.

8. The method of claim 7, wherein said sorting transaction log identifiers from the plurality of client requests is based on a transaction or log time or chronology indicated in the plurality of client requests.

9. The method of claim 6, wherein said generating the plurality of consolidated requests comprises:
mapping the plurality of client requests to the plurality of consolidated requests to be transmitted to at least one of the plurality of transaction log storage devices.

10. The method of claim 6, wherein said maintaining a sorted list comprises:
combining transaction log identifiers from at least some of the plurality of client requests.

11. The method of claim 6, wherein said maintaining a sorted list comprises:
de-duplicating transaction log identifiers from the plurality of client requests.

12. The method of claim 6, wherein the plurality of transaction log storage devices comprise multiple tiers of storage, and wherein retrieving the transaction logs identified in the consolidated requests comprises:
retrieving each of the transaction logs from one of the multiple tiers of storage.

13. The method of claim 6, wherein said serving the plurality of transaction logs to the plurality of clients from the log pool cache comprises:
serving a log in the plurality of transaction logs to a client in the plurality of clients out of order in the plurality of client requests based on logs in the log pool cache.

14. The method of claim 6, further comprising:
prefetching a transaction log for an expected client request using a consolidated request of the plurality of consolidated requests.

15. A computer-readable storage medium having program instructions recorded thereon that, when executed by a processing circuit, perform a method comprising:
receiving from a plurality of clients a plurality of client requests for a plurality of transaction logs in a database management service or system;
maintaining a sorted list of transaction log identifiers that identify the plurality of transaction logs requested by the plurality of clients;
generating a plurality of consolidated requests, each consolidated request identifying transaction logs corresponding to a range of transaction log identifiers in the sorted list;
retrieving, from a plurality of transaction storage devices, the transaction logs identified in the consolidated requests;

consolidating the plurality of transaction logs retrieved from the plurality of transaction log storage devices into a log pool cache; and serving the plurality of transaction logs to the plurality of clients from the log pool cache.

16. The computer-readable storage medium of claim 15, wherein said maintaining a sorted list comprises at least one of the following:

sorting transaction log identifiers from the plurality of client requests;

mapping the plurality of client requests to the plurality of consolidated requests to be transmitted to at least one of the plurality of transaction log storage devices;

combining transaction log identifiers from at least some of the plurality of client requests; or de-duplicating transaction log identifiers from the plurality of client requests.

17. The computer-readable storage medium of claim 16, wherein said sorting transaction log identifiers from the plurality of client requests is based on a transaction or log time or chronology indicated in the plurality of client requests.

18. The computer-readable storage medium of claim 15, wherein the plurality of transaction log storage devices comprises multiple tiers of storage, and wherein said retrieving the transaction logs identified in the consolidated requests comprises:

retrieving each of the transaction logs from one of the multiple tiers of storage.

19. The computer-readable storage medium of claim 15, wherein serving the plurality of transaction logs to the plurality of clients from the log pool cache comprises:

serving a log in the plurality of transaction logs to a client in the plurality of clients out of order in the plurality of client requests based on logs in the log pool cache.

20. The computer-readable storage medium of claim 15, the method further comprising:

prefetching a transaction log for an expected client request using a consolidated request of the plurality of consolidated requests.

* * * * *